(12) United States Patent
Sakata

(10) Patent No.: US 8,690,366 B2
(45) Date of Patent: Apr. 8, 2014

(54) VEHICLE OUTSIDE MIRROR DEVICE

(75) Inventor: Ikuo Sakata, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 429 days.

(21) Appl. No.: 13/042,886

(22) Filed: Mar. 8, 2011

(65) Prior Publication Data

US 2011/0228412 A1 Sep. 22, 2011

(30) Foreign Application Priority Data

Mar. 17, 2010 (JP) .................................. 2010-060933

(51) Int. Cl.
*G02B 7/182* (2006.01)

(52) U.S. Cl.
USPC ........................................................... 359/872

(58) Field of Classification Search
USPC .......................................... 359/841, 872, 883
See application file for complete search history.

(56) References Cited

U.S. PATENT DOCUMENTS

| | | | |
|---|---|---|---|
| 4,681,409 A | 7/1987 | Enomoto | |
| 4,696,555 A | 9/1987 | Enomoto | |
| 4,919,526 A | 4/1990 | Umekawa et al. | |
| 4,964,712 A * | 10/1990 | Anderson | 359/405 |
| 4,982,926 A | 1/1991 | Mori et al. | |

(Continued)

FOREIGN PATENT DOCUMENTS

| | | |
|---|---|---|
| DE | 29 06 102 A1 | 8/1980 |
| DE | 44 27 410 A1 | 2/1996 |

(Continued)

OTHER PUBLICATIONS

Sakata, U.S. PTO Office Action, U.S. Appl. No. 13/042,911, dated Mar. 12, 2012, 5 pages.

(Continued)

*Primary Examiner* — Frank Font
(74) *Attorney, Agent, or Firm* — Foley & Lardner LLP

(57) ABSTRACT

A vehicle outside mirror device according to the present invention is provided with a base 2, a shaft 3, a spring 10, a mirror assembly 4, and a washer 6. An annular line contact portion 50 is provided on an abutment face 35 of the washer 6 that abuts against an abutment face 33 of a mount portion 12 of the mirror assembly 4. As a result, the vehicle outside mirror device according to the present invention can prevent generation of abnormal noise further reliably and a further long period of time by means of the annular line contact portion 50. In addition, an abutment plane 301 of a rotation stop portion is provided at a shaft 3. A linear edge 601 of the rotation stop portion is provided at the washer 6. As a result, according to the vehicle outside mirror device of the present invention, the linear edge 601 of the rotation stop portion of the washer 6 is abutted against the abutment plane 301 of the rotation stop portion of the shaft 3, whereby the washer 6 is fixed to the shaft 3 and then generation of abnormal noise can be prevented further reliably and over a further long period.

4 Claims, 22 Drawing Sheets

(56) References Cited

U.S. PATENT DOCUMENTS

| | | |
|---|---|---|
| 5,384,660 A | 1/1995 | Oishi |
| 5,734,517 A | 3/1998 | Kang |
| 6,130,514 A | 10/2000 | Oesterholt et al. |
| 6,132,050 A | 10/2000 | Sakata et al. |
| 6,361,179 B1 | 3/2002 | Miyabukuro |
| 6,793,358 B2 | 9/2004 | Sakata |
| 6,877,867 B1 | 4/2005 | Murakami |
| 7,008,067 B2 | 3/2006 | Hsu |
| 7,441,912 B2 | 10/2008 | Onuki |
| 7,815,324 B2 | 10/2010 | Sakata |
| 2003/0218812 A1 | 11/2003 | Foote et al. |
| 2007/0211356 A1 | 9/2007 | Brester et al. |
| 2011/0228412 A1 | 9/2011 | Sakata |

FOREIGN PATENT DOCUMENTS

| | | |
|---|---|---|
| EP | 0 314 135 B1 | 5/1989 |
| EP | 1 481 850 A1 | 12/2004 |
| EP | 1 908 635 B1 | 4/2008 |
| JP | 61-110639 A | 5/1986 |
| JP | 2002-117710 A | 4/2002 |
| JP | 2009-090926 A | 4/2009 |

OTHER PUBLICATIONS

U.S. PTO Office action issued on Oct. 5, 2011 from U.S. Appl. No. 13/042,911, filed Mar. 8, 2011.

* cited by examiner (A)

(B)

(C)

(A)

(B)

(C)

(A)

(B)

(C)

(A)

(B)

(C)

VEHICLE OUTSIDE MIRROR DEVICE

CROSS REFERENCE TO RELATED APPLICATIONS

This application claims priority of Japanese Patent Application No. 2010-060933 filed on Mar. 17, 2010. The contents of this application are incorporated herein by reference in their entirety.

BACKGROUND OF THE INVENTION

1. Field of the Invention

The present invention relates to a vehicle outside mirror device such as a door mirror, for example, which enables a mirror assembly to tilt (rotate or turn) relative to a vehicle body (such as a door, a fender, or a pillar, for example). In other words, the present invention relates to vehicle outside mirror devices of manual storage type and electrically driven storage type.

2. Description of the Related Art

The vehicle outside mirror devices of such types are conventionally known (for example, Japanese Patent Application Laid-open No. 2002-117710). Hereinafter, a conventional vehicle outside mirror will be described. In the conventional vehicle outside mirror device, a mirror body is turnably engaged with a shaft via a clutch, a coil spring for imparting an engagement force to the clutch is reductively provided at an outer circumference of the shaft, and a plurality of evagination stripes are formed on a receiving face of the coil spring. In the conventional vehicle outside mirror device, the clutch is disengaged by manually driving or an electrically driving it, the mirror body turns between a use location and a storage location relative to the shaft, or alternatively, if a load is applied to the mirror body that is positioned in the use location, the clutch is disengaged, the mirror body turns relative to the shaft, and then, a buffering action works. In addition, in the conventional vehicle outside mirror device described previously, when the mirror body turns, the coil spring slips on the plurality of evagination stripes of the receiving face of the coil spring, thus preventing generation of abnormal noise.

However, in the conventional vehicle outside mirror device described previously, when the coil spring slips on the plurality of swelling stripes of the receiving face of the coil spring, a tip end of the coil spring can be caught by the evagination stripes. Therefore, there is a possibility that generation of abnormal noise cannot be reliably prevented.

In order to overcome this difficulty, the Inventor of the present application previously invented a vehicle outside mirror device (Japanese Patent Application Laid-open No. 2009-90926) which was made to solve the problem(s) of the conventional outside mirror device described previously. In this vehicle outside mirror device, among an abutment face of a mirror assembly and an abutment face of a washer, a respective one of which abut against each other, a non-smoothened face portion made of a surface which is obtained by surface texturing is provided on at least one of these abutment faces, and generation of abnormal noise can be reliably prevented.

The present invention has been made to solve the above-described problem. It is an object of the present invention to provide a vehicle outside mirror device which is capable of preventing generation of abnormal noise further reliably and over a further long period of time.

SUMMARY OF THE INVENTION

A first aspect of the present invention is directed to a vehicle outside mirror device, comprising:

a base which is fixed to a vehicle body;
a shaft which is fixed to the base;
a spring which is disposed in a state in which the spring is compressed at a periphery of the shaft;
a mirror assembly which is equipped to be able to tilt relative to the shaft; and
a washer which is disposed on the periphery of the shaft and is abutted against the mirror assembly by means of the spring,
wherein an annular line contact portion is provided on at least either one of an abutment face of the mirror assembly and an abutment face of the washer, a respective one of which abut against each other.

A second aspect of the present invention is directed to the vehicle outside mirror device according to the first aspect, wherein the annular line contact portions are provided on the face of the washer, a respective one of which abut against the mirror assembly, and a face opposite thereto.

A third aspect of the present invention is directed to the vehicle outside mirror device according to the first aspect, wherein a surface-textured surface is provided on at least either one of the abutment face of the mirror assembly and the abutment face of the washer, a respective one of which abut against each other.

A fourth aspect of the present invention is directed to the vehicle outside mirror device according to the first aspect, wherein:

a rotation stop portion for stopping the washer from rotating around a rotational center of the shaft is provided at a respective one of the shaft and the washer; and
the washer is mounted on the shaft so as to disable rotation around the rotational center of the shaft by means of the rotation stop portion.

A fifth aspect of the present invention is directed to a vehicle outside mirror device, comprising:

a base which is fixed to a vehicle body;
a shaft which is fixed to the base;
a spring which is disposed in a state in which the spring is compressed at a periphery of the shaft;
a mirror assembly which is equipped to be able to tilt relative to the shaft; and
a washer which is abutted against the mirror assembly by means of the spring,
wherein: a rotation stop portion for stopping the washer from rotating around the rotational center of the shaft is provided at a respective one of the shaft and the washer; and
the washer is mounted on the shaft so as to disable rotation around the rotational center of the shaft by means of the rotation stop portion.

A sixth aspect of the present invention is directed to the vehicle outside mirror device according to the fifth aspect, wherein:

a through hole for engagement with the shaft is provided at the washer;
at least one linear edge is provided at an inner circumferential rim of the through hole of the washer;
at least one abutment plane against which the linear edge of the washer is provided on an outer circumferential face of the shaft; and
the linear edge of the washer and the abutment plane of the shaft configure a rotation stop portion.

A seventh aspect of the present invention is directed to the vehicle outside mirror device according to the fifth aspect, wherein:

at least one groove is provided at the shaft in an axial direction of the shaft;

at least one engagement claw portion of a stop is engaged with a rim of a groove of the shaft;

the spring is disposed in a state in which the spring is compressed between the washer and the stop;

a through hole for engagement with the shaft is provided at the washer;

at least one engagement protrusive portion engaging with the rim of the groove of the shaft is provided at an inner circumferential rim of the through hole of the washer; and the engagement protrusive portion of the washer and the rim of the groove of the shaft configure the rotation stop portion.

An eighth aspect of the present invention is directed to the vehicle outside mirror device according to the fifth aspect, wherein:

the through hole for engagement with the shaft is provided at the washer;

a number of small engagement protrusive portions or a number of small engagement recessed portions are provided at the inner circumferential edge of the through hole of the washer;

on an outer circumferential face of the shaft, a number of small engagement recessed portions or a number of small engagement protrusive portions with which a number of the small engagement protrusive portions or a number of the small engagement portions of the washer engage respectively are provided in an axial direction of the shaft; and a number of the small engagement protrusive portions or a number of the small engagement recessed portions of the washer and a number of the small engagement protrusive portions or a number of the small engagement recessed portions configure the rotation stop portion.

A ninth aspect of the present invention is directed to the vehicle outside mirror device according to the fifth aspect, wherein an annular line contact portion is provided on at least either one of the abutment face of the mirror assembly and the abutment face of the washer, a respective one of which abut against each other.

According to the first aspect of the present invention, in a vehicle outside mirror device, by means of an annular line contact portion, which is provided on at least either one of an abutment face of a mirror assembly and an abutment face of a washer, a respective one of which abut against each other, the abutment face of the mirror assembly and the abutment face of the washer abut against each other in a state of annular line contact, whereby a contact area between the abutment face of the mirror assembly and the abutment face of the washer can be reduced to its required minimum and a pseudo fixation (suspect wearing or adsorption) due to intimate contact between the abutment face of the mirror assembly and the abutment face of the washer can be prevented. In this manner, the vehicle outside mirror device of the present invention slides between the abutment face of the fixing washer that includes a base, a shaft, and a spring or the like and the abutment face of the rotating (tilting) mirror assembly when the mirror assembly rotates around the shaft. As a result, the vehicle outside mirror device of the present invention does not slide between the spring and the washer, so that: unlike the conventional vehicle outside mirror device described previously in which a coil spring slips on a plurality of evagination stripes of a receiving face of the coil spring, a spring is not caught by a receiving face of the spring; and generation of abnormal noise can be reliably prevented.

In addition, in the vehicle outside mirror device, the abutment face of the mirror assembly and the abutment face of the washer abut against each other in a state of annular line contact by means of the annular line contact portion, so that the mirror unit can slide smoothly between the abutment face of the mirror assembly and the abutment face of the washer in comparison with the conventional vehicle outside mirror device described previously in which the abutment face of the mirror assembly and the abutment face of the washer abut against each other in a state of an unlimited number of point contacts due to surface texturing. As a result, the vehicle outside mirror device according to the first aspect of the present invention can prevent generation of abnormal noise further reliably and over a further long period of time. In other words, this mirror device is excellent in durability.

According to the second aspect of the present invention, a vehicle outside mirror device provides an annular line contact portion on a respective one of a face of a washer, which abuts against a mirror assembly, and a face opposite thereto, so that there is no assembling direction (such as top and ground, top and bottom, or top face and back face) of a washer when the washer is assembled to a shaft or a mirror assembly together with a spring. Therefore, assembling workability is improved in comparison with a washer having an annular line contact portion provided on one face thereof.

According to the third aspect of the present invention, in a vehicle outside mirror device, a surface-textured surface, i.e., microscopic irregularity is provided on at least either one of an abutment face of a mirror assembly and a abutment face of a washer, a respective one of which abut against each other, so that the abutment face of the mirror assembly and the abutment face of the washer abut against each other in a state of annular line contact by means of an annular line contact portion and a state of an unlimited number of point contacts due to surface texturing. As a result, the vehicle outside mirror device of the present invention can slide further reliably between the abutment face of the fixing washer that includes a base, a shaft, and a spring or the like and the abutment face of the rotating mirror assembly and can prevent generation of abnormal noise further reliably and over a further long period of time. In other words, in the vehicle outside mirror device of the present invention, a contact area between the abutment face of the mirror assembly and the abutment face of the washer is reduced to its required minimum, whereby pseudo fixation due to intimate contact between the abutment face of the mirror assembly and the abutment face of the washer can be prevented. Therefore, the mirror unit can slide stably between the abutment face of the fixing washer including the base, shaft, and the spring or the like and the abutment face of the rotating mirror assembly.

According to the fourth aspect of the present invention, in a vehicle outside mirror device, a washer is mounted on a shaft so as to disable rotation around a rotational center of a shaft by means of a rotation stop portion of the shaft and a rotation stop portion of the washer, making it possible to stop the washer from rotating around the rotational center.

In other words, the washer is fixed and does not rotate when a mirror assembly rotates around the shaft. As a result, in the vehicle outside mirror device of the present invention, due to a synergetic effect between a function of the annular line contact portion and a function of the rotation stop portion, when the mirror assembly rotates around the shaft, the mirror unit slides further reliably between the abutment face of the fixing washer including a base, a shaft, and a spring or the like and the abutment face of the rotating mirror assembly.

According to the fifth aspect of the present invention, in a vehicle outside mirror device, a washer is mounted on a shaft to disable rotation around a rotational center of the shaft, by means of a rotation stop portion of the shaft and a rotation stop portion of the washer, making it possible to stop the washer from rotating around the rotational center of the shaft. In other words, when a mirror assembly rotates around the shaft, the washer is fixed to the shaft and does not rotate. Therefore, in the vehicle outside mirror device of the present invention, when the mirror assembly rotates around the shaft, the mirror unit slides between an abutment face of the fixing washer including a base, a shaft, and a spring or the like and an abutment face of the rotating (tilting) mirror assembly. As a result, the vehicle outside mirror device of the present invention does not slide between the spring and the washer, so that a spring is not caught by a receiving face of the spring or generation of abnormal noise can be reliably prevented unlike the conventional outside mirror device described previously in which a coil spring slips on a plurality of evagination stripes of a receiving face of the coil spring.

In addition, the vehicle outside mirror device of the present invention stops a washer to rotate around a rotational center of a shaft, by means of a rotation stop portion of the shaft and a rotation stop portion of the washer. As a result, the vehicle outside mirror device of the present invention can prevent generation of abnormal noise further reliably and over a further long period of time in comparison with the conventional vehicle outside mirror described previously, the outside mirror sliding between an abutment face of a mirror assembly and an abutment face of a washer, a respective one of which abut against each other in a state of an unlimited number of point contacts due to surface texturing. In other words, the vehicle outside mirror device of the present invention is excellent in durability.

According to the sixth aspect of the present invention, in a vehicle outside mirror device, a rotation stop portion is made of at least a linear edge which is provided at an inner circumferential rim of a through hole of a washer and at least one abutment plane which is provided on an outer circumferential face of a shaft, so that the linear edge of the washer abuts against the abutment plane of the shaft, thereby making it possible to stop the washer from rotating around a rotational center of the shaft. In this manner, in the vehicle outside mirror device of the present invention, it is sufficient if: at least one linear edge is provided at the inner circumferential rim of the through hole of the washer; and at least one abutment plane is provided on the outer circumferential face of the shaft. Therefore, a structure of the mirror unit is simple and manufacturing cost can be reduced accordingly.

According to the seventh aspect of the present invention, in a vehicle outside mirror device, a rotation stop portion is made of: at least one engagement protrusive portion which is provided at an inner circumferential edge of a through hole of a washer and at least one groove which is provided at a shaft in an axial direction of the shaft, so that the engagement protrusive portion of the washer engages with a rim of the groove of the shaft, thereby making it possible to stop the washer from rotating around a rotational center of the shaft. Moreover, in the vehicle outside mirror device of the present invention, an engagement claw portion of a stop engages with the rim of the groove of the shaft, whereby a spring is disposed in a state in which the spring is compressed between the washer and the stop. In this manner, in the vehicle outside mirror device of the present invention, the rim of the groove of the shaft serves as both of an engagement portion with which the engagement claw portion of the stop engages and an engagement portion with which the engagement protrusive portion of the washer engages. Therefore, a structure of the mirror unit becomes simple and manufacturing cost can be reduced accordingly.

According to the eighth aspect of the present invention, in a vehicle outside mirror device, a rotation stop portion is made of a number of small engagement protrusive portions or a number of small engagement recessed portions which are provided at an inner circumferential rim of a through hole of a washer and a number of small engagement recessed portions or a number of small engagement protrusive portions which are provided in an axial direction of a shaft on an outer circumferential face of the shaft, so that a number of the small engagement protrusive portions or a number of the small recessed portions of the washer are engaged with a number of the small engagement recessed portions or a number of the small engagement protrusive portions of the shaft, thereby making it possible to stop the washer from rotating around a rotational center of the shaft. In this manner, in the vehicle outside mirror device of the present invention, a number of the small engagement protrusive portions or a number of the small engagement recessed portions are provided at the inner circumferential rim of the through hole of the washer, whereas a number of the small engagement recessed portions or a number of the small engagement protrusive portions are provided in the axial direction of the shaft on the outer circumferential face of the shaft. Therefore, when the washer is assembled to the shaft, there is no need for positioning between the shaft and the washer (such as positioning in rotating direction or circumferential direction around rotational center of shaft). Hence, assembling workability is improved and manufacturing cost can be reduced accordingly.

According to the ninth aspect of the present invention, in a vehicle outside mirror device, an annular line contact portion is provided on at least either one of an abutment face of a mirror assembly and an abutment face of a washer, a respective one of which abut against each other, so that: the abutment face of the mirror assembly and the abutment face of the washer abut against each other in a state of annular line contact; a contact area between the abutment face of the mirror assembly and the abutment face of the washer can be reduced to its required minimum; and pseudo fixation (suspect wearing or adsorption) due to intimate contact between the abutment face of the mirror assembly and the abutment face of the washer can be prevented. Therefore, in the vehicle outside mirror device of the present invention, when the mirror assembly rotates around a shaft, the mirror unit slides smoothly between the abutment face of the fixing washer including a base, a shaft, and a spring or the like and the abutment face of the rotating mirror assembly. As a result, in the vehicle outside mirror device of the present invention, due to a synergetic effect between a function of the rotation stop portion and a function of the annular line abutment portion, when the mirror assembly rotates around the shaft, the mirror unit slides further reliably between the abutment face of the fixing washer including the base, the shaft, and the spring or the like and the abutment face of the rotating mirror assembly.

DESCRIPTION OF THE PREFERRED EMBODIMENTS

Hereinafter, six embodiments of a vehicle outside mirror device according to the present invention will be described in detail with reference to the drawings. It should be noted that the present invention is not limited by these six embodiments.

First Embodiment

Figure 10:
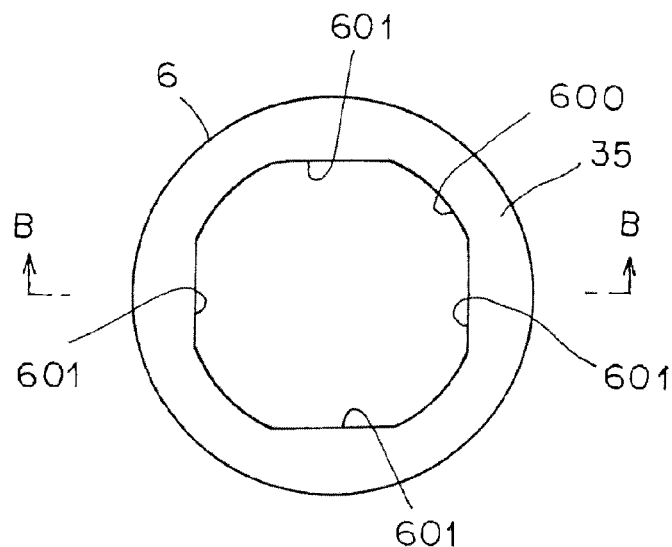
FIG. 10 is an explanatory view showing a washer of which center part is shaped to be increased in thickness, similarly.
Figure 10:
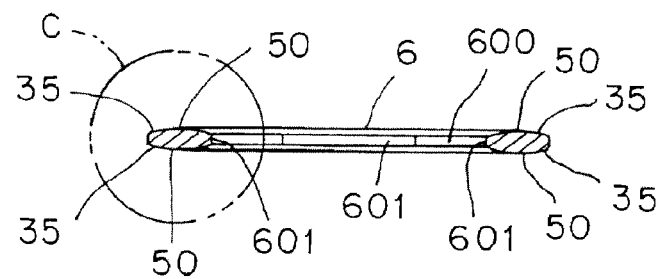
Figure 10:
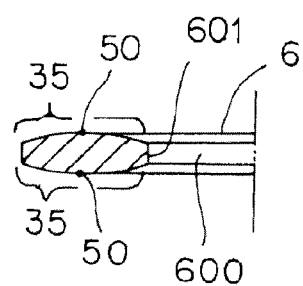
Figure 11:
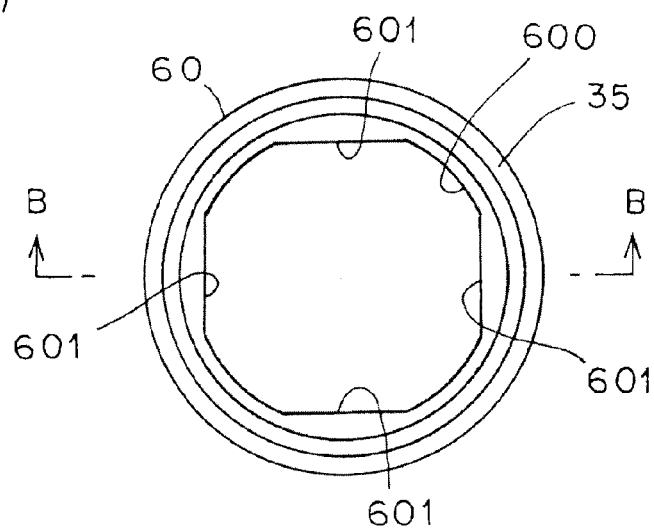
FIG. 11 is an explanatory view showing a modification example of a washer, the washer having a rib provided at a center portion thereof, similarly.
Figure 11:
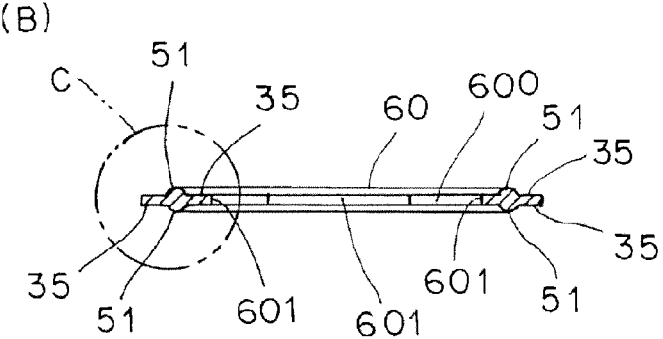
Figure 11:
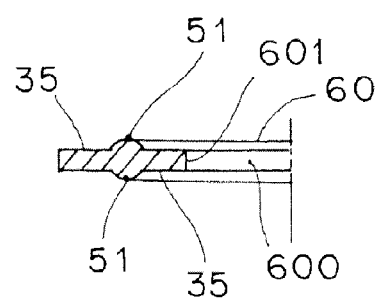
Figure 12:
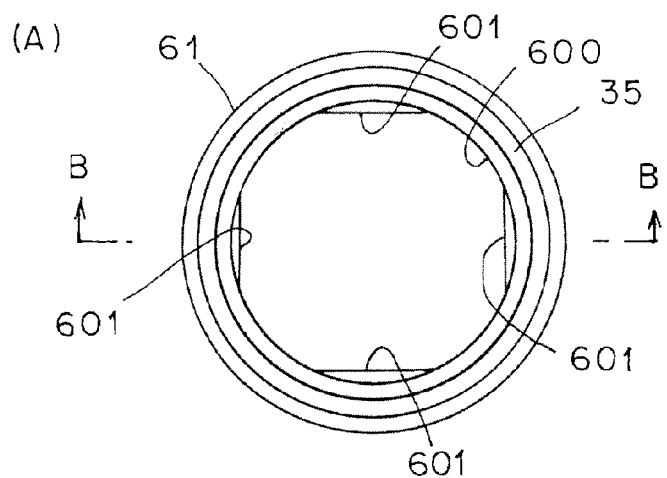
FIG. 12 is an explanatory view showing a modification example of a washer, the washer having a rib at each end part thereof, similarly.
Figure 12:
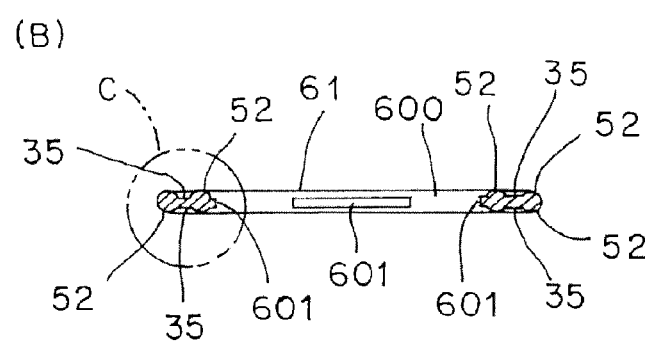
Figure 12:
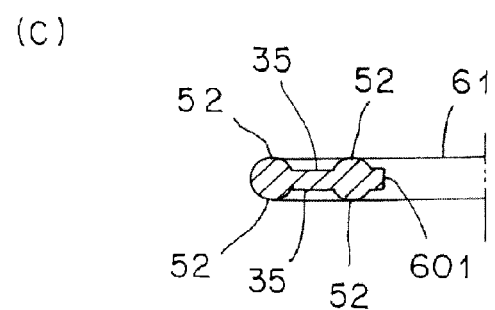
Figure 13:
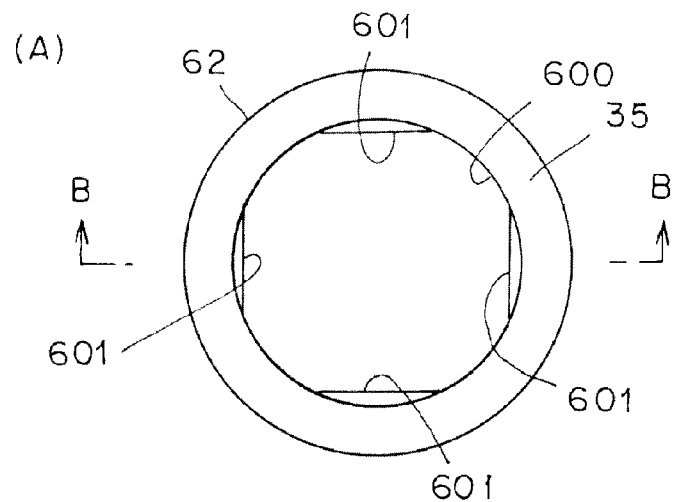
FIG. 13 is an explanatory view showing a modification example of a washer, the washer of which cross section is formed in a circular (or elliptical) shape, similarly.
Figure 13:
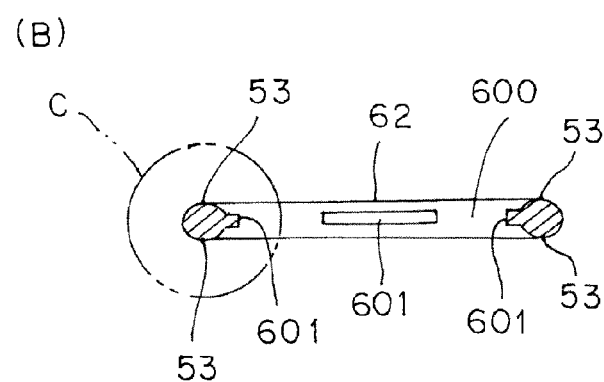
Figure 13:
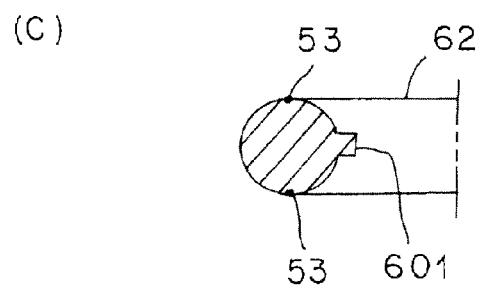

FIG. 1 to FIG. 13 each show a first embodiment of a vehicle outside mirror device according to the present invention. FIG. 10(A) is a plan view (or a front view) of a washer of which center part is shaped to be increased in thickness; FIG. 10(B) is a cross section taken along the line B-B in FIG. 10(A); and FIG. 10(C) is a partially enlarged cross section of the portion C in FIG. 10(B). FIG. 11(A) is a plan view (or a front view) of a washer having a rib at a center part thereof; FIG. 11(B) is a cross section taken along the line B-B in FIG. 11(A); and FIG. 11(C) is a partially enlarged cross section of the portion C in FIG. 11(B). FIG. 12(A) is a plan view (or a front view) of a washer having a rib at each end part thereof; FIG. 12(B) is a cross section taken along the line B-B in FIG. 12(A); and FIG. 12(C) is a partially enlarged cross section of the portion C in FIG. 12(B). FIG. 13(A) is a plan view (or a front view) of a washer of which cross section is formed in a circular (or elliptical) shape; FIG. 13(B) is a cross section taken along the line B-B in FIG. 13(A); and FIG. 13(C) is a partially enlarged cross section of the portion C in FIG. 13(B).

[Description of Configuration]

Figure 1:
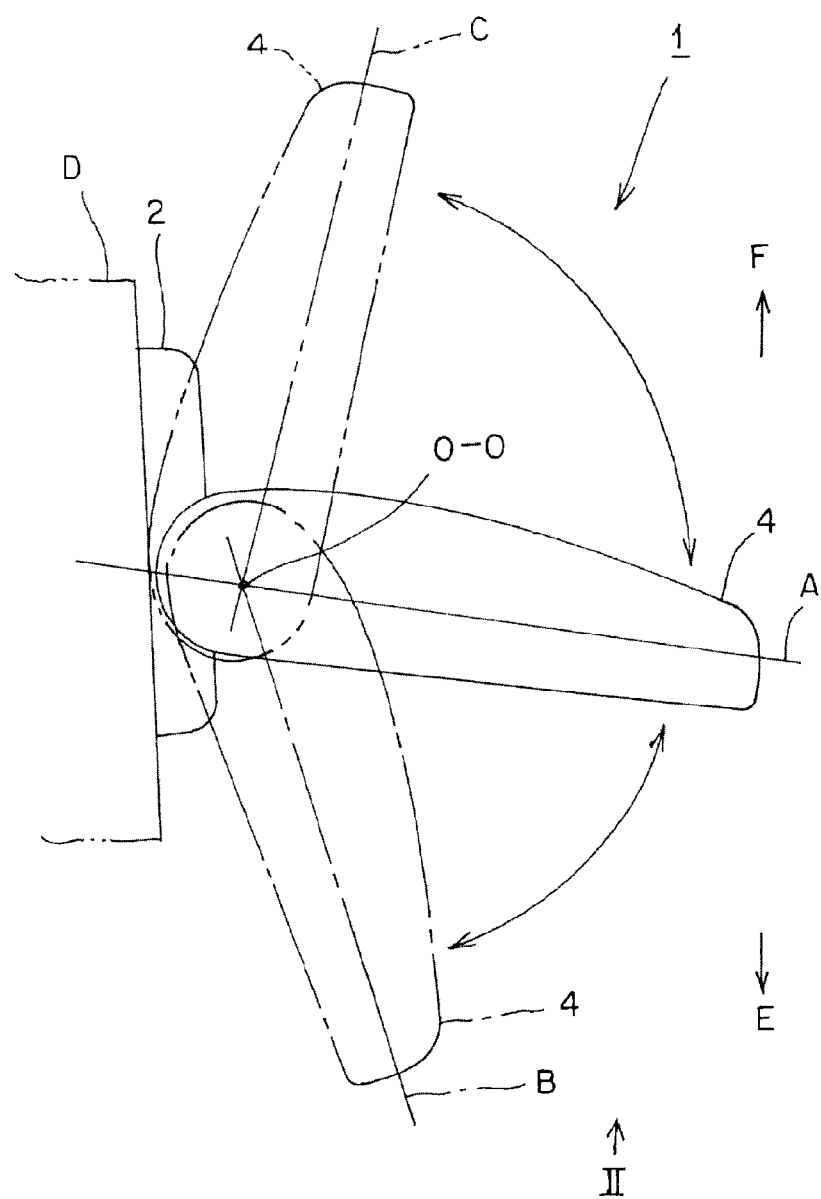
FIG. 1 is a plan view of a use state showing a first embodiment of a vehicle outside mirror device according to the present invention.
Figure 2:
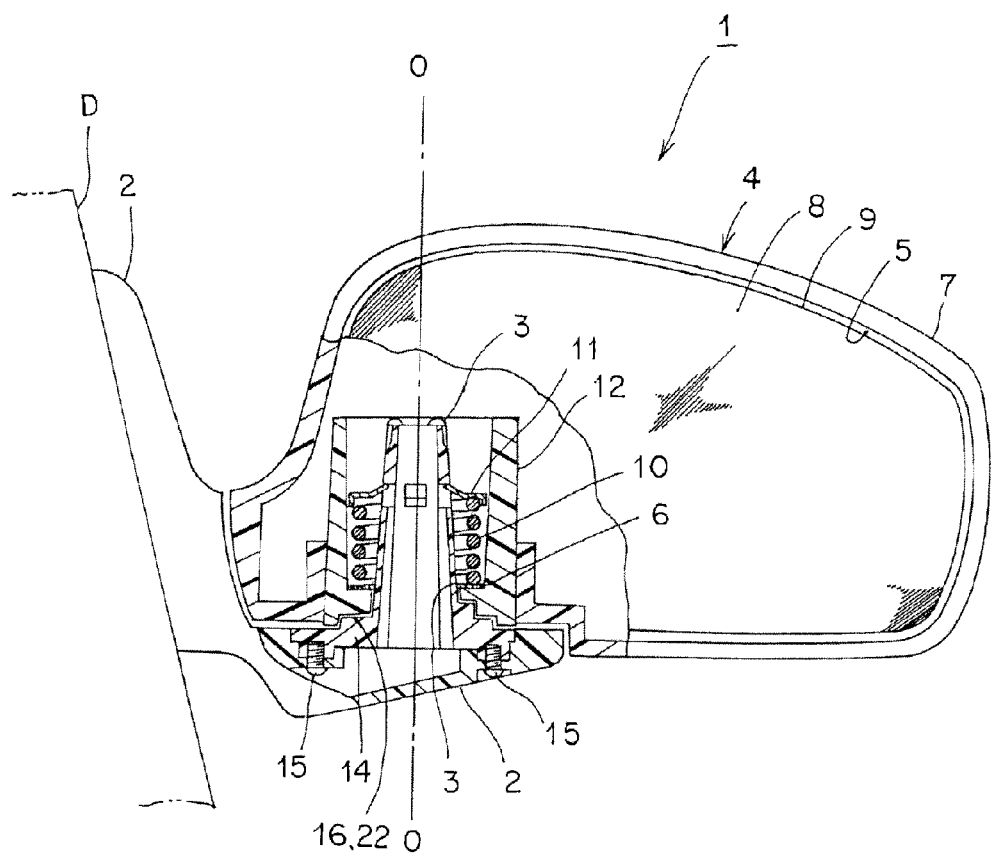
FIG. 2 is a partially broken front view showing a door mirror, the view being taken along the line II in FIG. 1, similarly.

Hereinafter, a configuration of a vehicle outside mirror device in the first embodiment will be described. In FIG. 1 and FIG. 2, reference numeral 1 designates the vehicle outside mirror device in the first embodiment and a manual storage type door mirror for automobile (vehicle) in this example. A door mirror 1 of the first embodiment is equipped at a respective one of left and right doors D of an automobile. The door mirror 1 of the first embodiment is equipped at the right side door D of the automobile and the door mirror equipped at the left side door of the automobile is substantially reversed at the left and right from the door mirror 1 of the first embodiment.

The door mirror 1 of the first embodiment is provided with: a base 2 which is fixed to the door D; a shaft 3 which is fixed to the base 2; and a mirror assembly 4 which is equipped to be able to tilt (rotate or turn) to the shaft 3 via a spring 10, a stop (a so called push nut) 11, a washer 6, and positioning means 16, 22.

The shaft 3 is formed of a die molded article (a molded article) made of a resin (a mere resin or a resin containing a glass fiber or a carbon fiber) or made of a metal (a die cast metal or a press metal). The shaft 3, as shown in FIG. 2 to FIG. 5, is formed in a cylindrical or columnar shape, and on an outer circumferential face of the shaft 3, a taper called a pulling slope is provided in order to easily remove the shaft 3 as a molded article from a die. In other words, the outer circumferential face of the shaft 3 is formed in a tapered shape (a tilt face or a tapered face) in which an outer diameter thereof gradually increases from one end (an upper end) to the other end (a lower end). As a result, the shaft 3 after molded can be easily removed from a die.

The mirror assembly 4 is comprised of: a mirror housing 7 which is opened at one side and is closed at the other side; a mirror unit (a so called mirror) 9 disposed at an opening portion 5 of the mirror housing 7 and having a reflection surface 8. The mirror unit 9 is mounted in the mirror housing 7 so as to able to adjust an angle of the reflection surface 8 in a transverse direction around a substantially vertical shaft and in a longitudinal direction around a substantially horizontal shaft via a remote control unit or a power unit (not shown).

The mirror housing 7 has a mount portion 12 which is mounted on the shaft 3 to be able to tilt around the shaft 3 via the stop 11, the washer 6, and the positioning means 16, 22. The mount portion 12, like the shaft 3, is formed of a die molded article (a molded article) made of a resin (a mere resin or a resin containing a glass fiber or a carbon fiber) or is made of a metal (a die cast metal or a press metal). The mount portion 12 is comprised of a frame or a bracket independent of the mirror housing 7, and is integrally fixed to the mirror housing 7.

The mount portion 12, as shown in FIG. 2 to FIG. 7, is formed in a hollow-like sectional recessed shape that is opened at one end (an upper end) and is closed at the other end (a lower end). A circular through hole 25 is provided at a center of a lower end closed part of the mount portion 12. The lower end closed part of the mount portion 12 is a receptacle portion of the washer 6 and an abutment face 33 of a top face thereof is formed in the shape of a plane.

A shaft holder 14 is integrally provided at the other end of the shaft 3. The shaft holder 14 is fixed to the base 2 by means of a screw 15. As a result, the shaft 3 is fixed to the base 2.

The positioning means 16, 22 are provided on one face of the shaft holder (a top face on which the shaft 3 is integrally provided) and one face of the mount portion 12 (bottom face which is opposite to one face of the shaft holder 14). The positioning means 16, 22 is adapted to position the mirror assembly 4 in a user location A (the location indicated by the solid line in FIG. 1) and a storage location B (the location indicated by single dotted chain line in FIG. 1). The positioning means is comprised of: an outer face of a notch-type positioning protrusive portion 22 provided on one face of the mount portion 12; and an inner face of a notch-type positioning recessed portion 16 which is provided on one face of the shaft holder 14 and with which the positioning protrusive portion 22 engages.

The positioning protrusive portion 22 is formed in a reversed trapezoidal shape (a sectional reversed trapezoidal shape) which is long at the top edge (the edge at one face side of the mount portion 12) and is short at the bottom edge. Although the number of the positioning protrusive portions 22 is not limited in particular, it is preferable that three protrusive portions are provided in consideration of a positioning balance or manufacturing cost or the like. The three positioning protrusive portions 22 are integrally provided on a circumference around a rotational center O-O of the shaft 3 on one face of the mount portion 12.

The positioning recessed portion 16 is formed in a reversed trapezoidal shape (a sectional reversed trapezoidal shape) which is long on the top edge (the edge at one face side of the shaft holder 14) and is short at the bottom edge. The number of the positioning recessed portions 16 is three which corresponds to the number of the positioning protrusive portions 22. The three positioning recessed portions 16 are provided on a circumference around the rotational center O-O of the shaft 3 on one face of the shaft holder 14.

The positioning recessed portion 16 and the positioning protrusive portion 22 engage with each other, whereby the mirror assembly 4 is located in the use location A. In addition, if the positioning recessed portion 16 and the positioning protrusive portion 22 are disengaged from each other, the mirror assembly 4 can rotate around the rotational center O-O of the shaft 3 and rotates between the use position A and the storage location D or between the use location A and a forward tilt position C (the position indicated by the double dotted chain line in FIG. 1).

Stopper means 29, 30 are provided on one face (a top face) of the shaft holder 14 and one face (a bottom face) of the mount portion 12. The stopper means 29, 30 are adapted to avoid abutment of the mirror assembly 4 against the door D when the mirror assembly 4 is positioned in the storage location B or the forward tilt position C. The stopper means are comprised of: an outer face of a stopper protrusive portion 29 which is provided on one face of the shaft holder 14; and an inner face of a stopper recessed portion (or a grooved portion) 30 which is provided on one face of the mount portion 12 and with which the stopper protrusive portion 29 engages.

Figure 4:
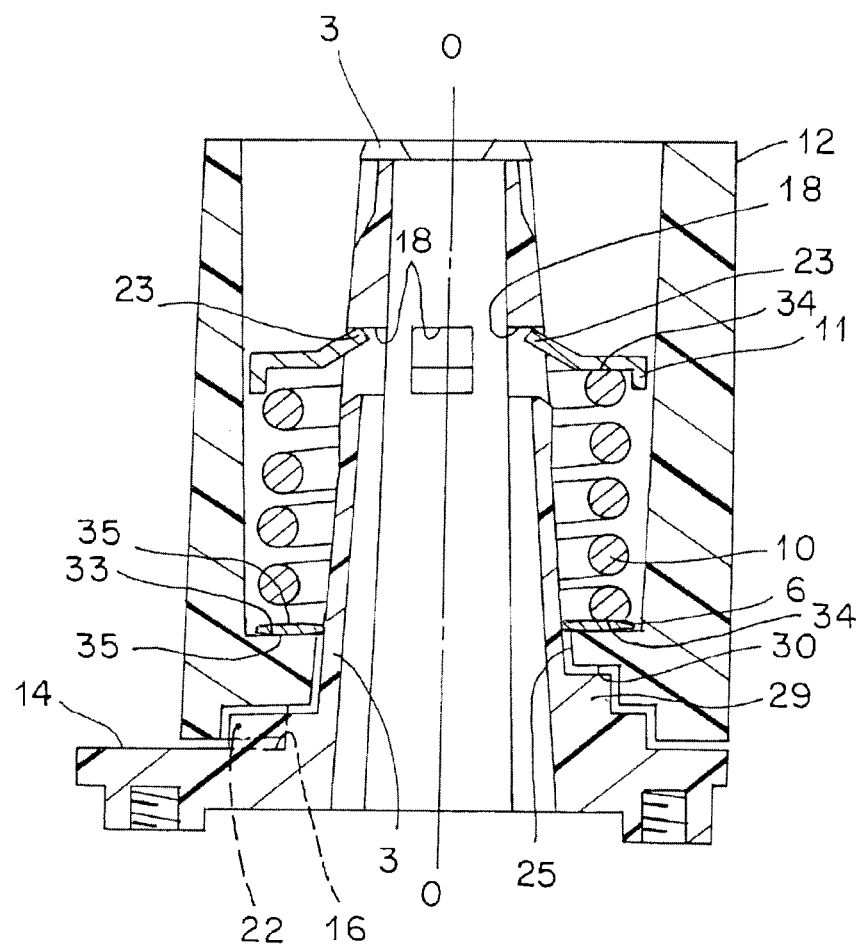
FIG. 4 is a longitudinal cross section (a vertical cross section) showing an assembling state of a shaft, a shaft holder, a mount portion, a washer, a spring, and a stop, similarly.
Figure 5:
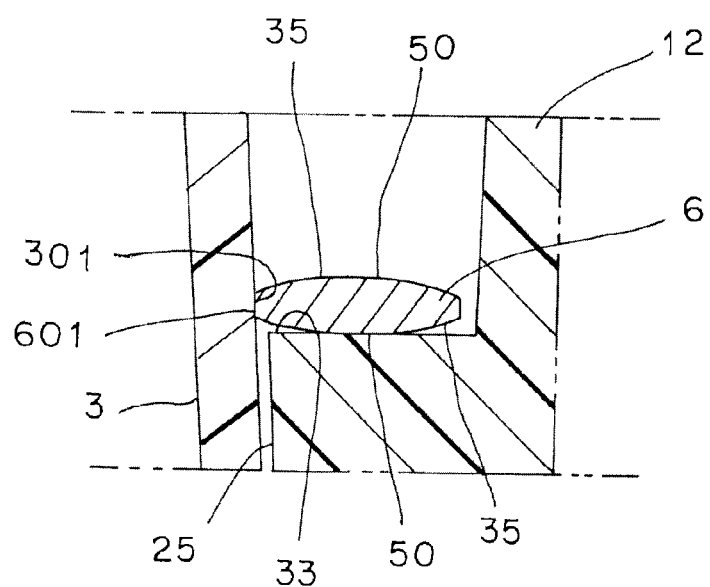
FIG. 5 is a partially enlarged longitudinal cross section (a partially enlarged vertical cross section) showing the assembling state of a shaft, a shaft holder, a mount portion, a washer, a spring, and a stop, similarly.
Figure 6:
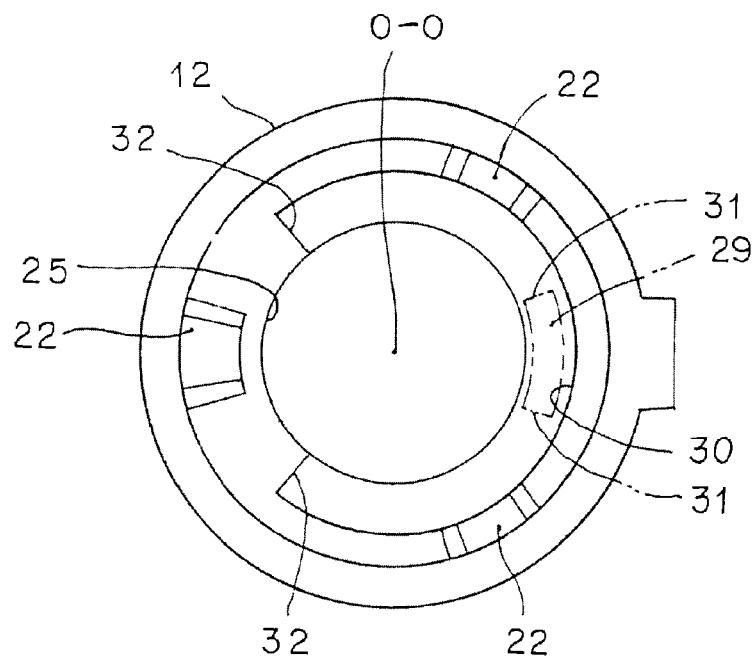
FIG. 6 is a bottom view of the mount potion, the view being taken along the line VI in FIG. 3, similarly.
Figure 7:
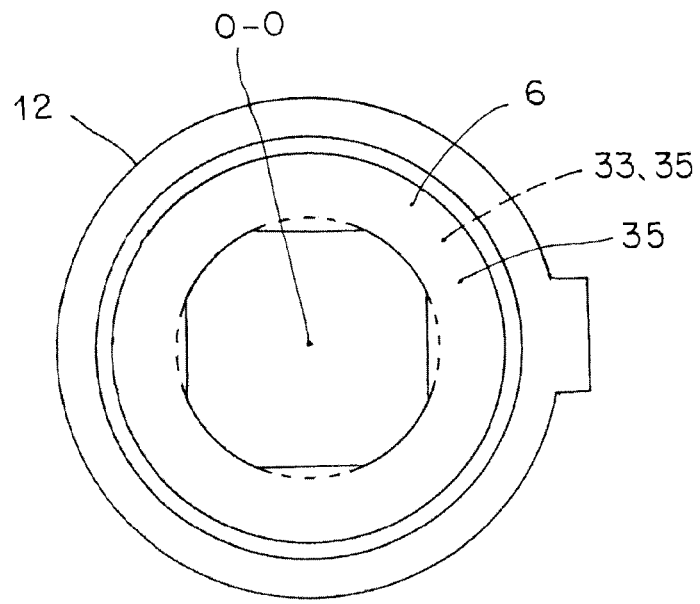
FIG. 7 is a bottom view of the mount potion, the view being taken along the line VI in FIG. 3, similarly.
Figure 8:
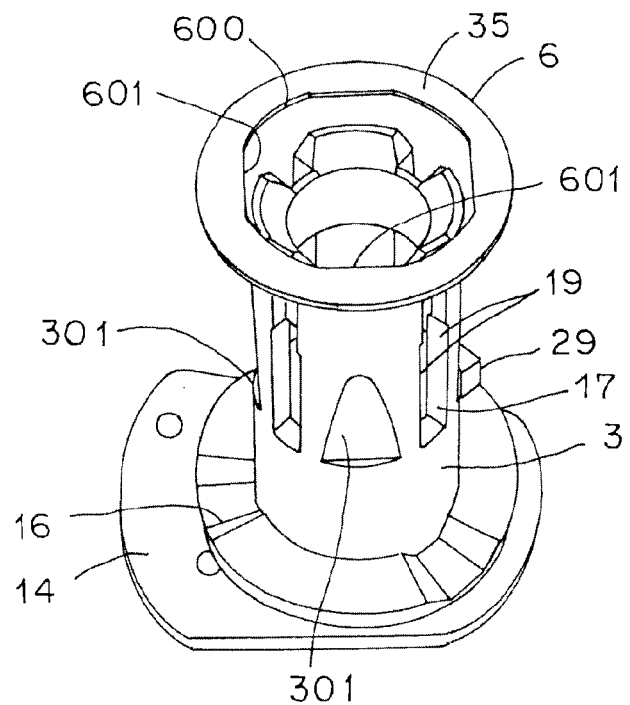
FIG. 8 is a partially perspective view showing a state before a washer is mounted on a shaft, similarly.
Figure 9:
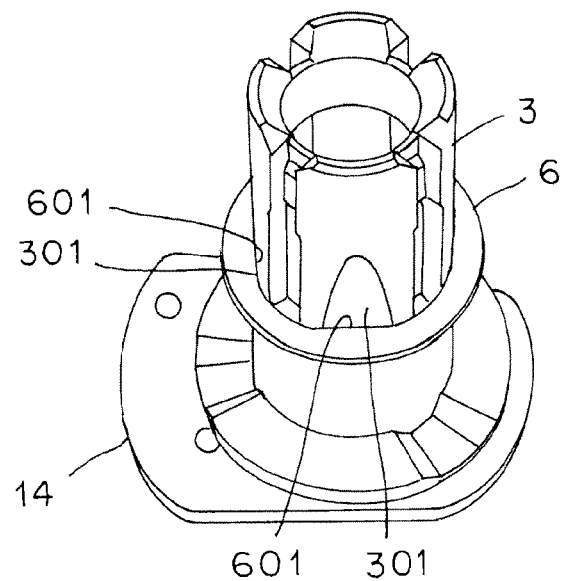
FIG. 9 is a partially perspective view showing a state in which a washer is mounted on a shaft so as to disable rotation around a rotational center of the shaft, similarly.

The stopper protrusive portion 29, as shown in FIG. 4 and FIG. 6, is made of a part of an arc around the rotational center O-O, and is integrally provided on one face of the shaft holder 14 along the shaft 3. The stopper recessed portion 30, as shown in FIG. 4 and FIG. 6, is made of a part of an arc around the rotational center O-O, and is provided on one face of the mount portion 12 along the through hole 25.

If the mirror assembly 4 rotates around the rotational center O-O of the shaft 3 and then is positioned in the storage location B or forward tilt position C immediately before the assembly abuts against the door D, an end face 31 of the stopper protrusive portion 29 and an end face 32 of the stopper recessed portion 30 abut against each other, thereby avoiding abutment of the mirror assembly 4 against the door D. A stopper recessed portion may be provided on one face of the shaft holder 14 or a stopper protrusive portion may be provided on one face of the mount portion 12. Moreover, the stopper protrusive portion 29 and the stopper recessed portion 30 engage with each other, thereby serving as a guide when the mirror assembly 4 rotates around the rotational center O-O of the shaft 3. In FIG. 1, reference uppercase letter E designates a backward direction of a vehicle and reference uppercase letter F designates a forward direction of a vehicle.

At the shaft 3, a plurality of grooves 17, four grooves 17 in this example, are provided at equal intervals from an upper end to an intermediate position. The grooves 17 are formed in a penetrative shape while an upper end part of the shaft 3 is left, whereas they are formed in a linked shape (or in a bridged shape at an upper end part of the shaft 3. Four engagement portions 18 are provided, respectively, at a stepped part on a boundary between a link portion and a penetrative portion of the four grooves 17 at an upper end part of the shaft 3. In addition, an engagement portion 19 is provided at each side face of the penetrative portion of the four grooves 17 of the shaft 3.

The stop 11 is comprised of a metal member having elasticity, and has a spring abutment potion 20 formed in a disk shape. All circumferential rims of the spring abutment portion 20 are bent in an L-shape in one direction (in a lower direction). Thus, the metallic stop 11 is formed in a circular plate shape with its shallow bottom. An insert hole 21 through which the shaft 3 is inserted is provided at a center of the spring abutment portion 20.

Figure 3:
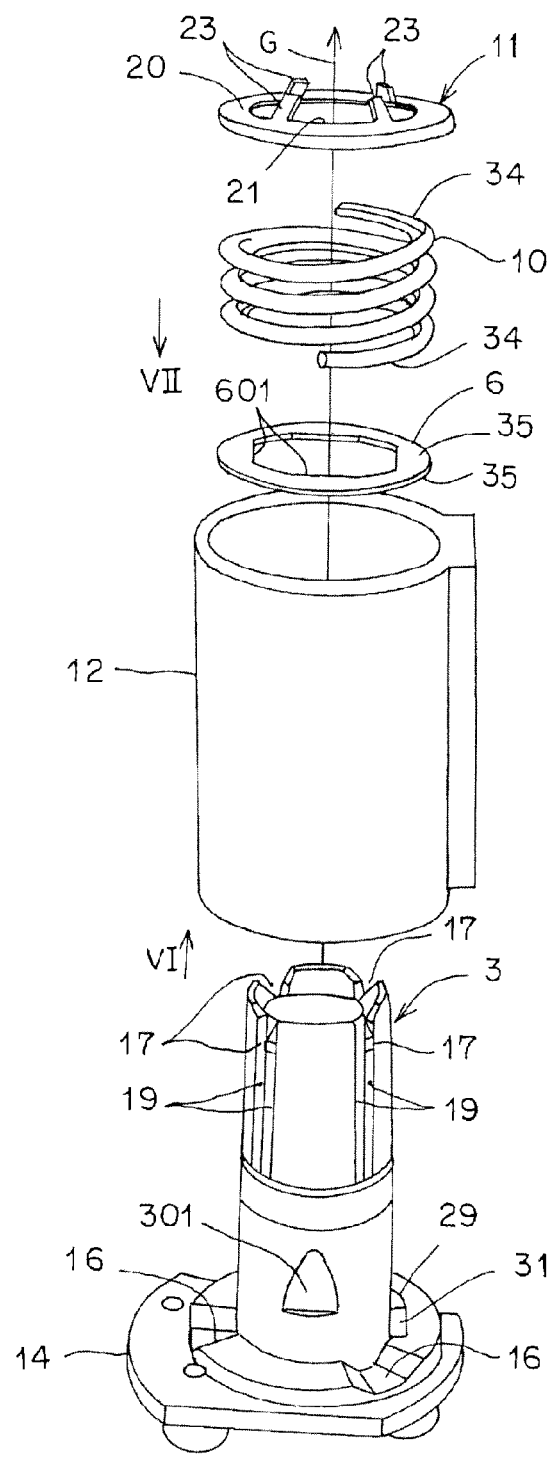
FIG. 3 is an exploded perspective view showing a shaft, a shaft holder, a mount portion, a washer, a spring, and a stop, similarly.

From the rims of the insert hole 21, a plurality of engagement claw portions, four engagement claw portions 23 in this example are provided, respectively, at equal intervals in an insertion direction G of the shaft 3 (Refer to the arrow G in FIG. 3. This direction is opposite to the bending direction of all circumferential edges of the spring abutment portion 20). The engagement claw portion 23 elastically engages with the engagement portion 18 of the shaft 3. A width of the engagement claw portion 23 is equal to or is slightly smaller than that of the groove 17 of the shaft 3. A portion at the circumferential side of the shaft 3 of the engagement claw portion 23 engagingly stops at the engagingly stop portion 19 of the shaft 3.

As the spring 10, a compression-type spring (a compression coil spring) is used. Each end face 34 of the spring 10 is processed to be formed in the shape of a plane by means of cutting processing so as to flatly abut against a respective one of the washer 6 and the spring abutment portion 20.

The washer 6 is comprised of a resin member or a metal member, for example. The washer 6 is externally formed in a circular shape. In addition, a through hole 600 for engagement with the shaft 3 is provided at a center of the washer 6. The washer 6 is formed in a thin-plate doughnut shape in which an outer diameter thereof is slightly smaller than an inner diameter of the mount portion 12. Of the washer 6, an annular line contact portion 50 is provided on an abutment face 35 which abuts against an abutment face 33 of the mount portion 12, and an abutment end face 34 of the spring 34.

The washer 6, as shown in FIG. 10(A), FIG. 10(B), and FIG. 10(C), is a washer of which center part is shaped in a thickened. In other words, a cross-sectional shape in radial direction of the washer 6 is formed in a shape of which center part is protruded in an arc shape relative to each end part (an end part of an inner circumferential rim side and an end part of an outer circumferential rim side) on each abutment face 35 of the washer 6. This arc-shaped apexes form the annular line contact portion 50.

A surface-textured surface (not shown) is provided on each abutment face 35 including the annular line contact potion 50 of the washer 6. As the surface, for example, surface No. "GR-504" which is available from Tanazawa Hakkosha Co., Ltd. is used.

At least one linear edge 601, four linear edges 601 in this example, are provided at an inner circumferential rim of the through hole 600 of the washer 6. As the linear edges 601, the four linear edges are provided at equal interval in a circumferential direction at an inner circumferential edge of a circular through hole. On the other hand, at least one abutment plane 301, four abutment planes 301 in this example, with which the linear edges 601 of the washer engage, are provided for the linear edges 601 of the washer 6. The linear edge 601 of the washer 6 and the abutment plane 301 of the shaft configures the rotation stop portion.

[Description of Assembling Process]

Hereinafter, a description will be given with respect to a process of assembling the mirror assembly 4 to be able to tilt relative to the shaft 3 via the spring 10, the stop 11, the washer 6, and the positioning means 16, 22.

First, the shaft 3 is inserted into the through hole 25 of the mount portion 12 of the mirror housing 7 and into the mount portion 12 in the direction indicated by the arrow G in FIG. 3 (the direction from the lower side to the upper side of the mirror housing 7), and then, a bottom face of the mount portion 12 is placed on a top face of the shaft holder 14. In addition, the positioning recessed portion 16 and the positioning protrusive portion 22 are engaged with each other and then the stopper protrusive portion 29 and the stopper recessed portion 30 are engaged with each other.

Next, the washer 6 and the spring 10 are sequentially dropped to the shaft 3 in an opposite direction to the direction indicated by the arrow G in FIG. 3 (the direction from the upper side to the lower side of the mirror housing 7) and then are placed on a top face of a lower end of the mount portion 12. In other words, the abutment face 35 at a bottom face side of the washer 6 is placed on the abutment face 33 of a washer receptacle portion of the mount portion 12 and the abutment end face 34 at a bottom face side of the spring 10 is placed on the abutment face 35 of a top face side of the washer 6.

Then, the four engagement claw portions 23 are aligned with the four grooves 17 of the shaft 3, respectively, and then, the stop 11 is dropped to the shaft 3 in an opposite direction to the direction indicated by the arrow G in FIG. 3. At this time, an outer circumferential face of the shaft 3 is formed in a tapered shape in which it broadens from an upper end to a lower end, so that the stop 11 stops partway of the shaft 3. In other words, a tip end of the engagement claw portion 23 of the stop 11 abuts against the link portion of the groove 17 of the shaft 3.

Subsequently, while the spring abutment portion 20 of the stop 11 is abutted against the abutment end face 34 at a top face side of the spring 10 with the use of a jig (not shown), the stop 11 is pushed against the shaft 3 against a spring force of the spring 10. Then, the engagement claw portion 23 of the stop 11 is elastically deformed and then a tip end of the engagement claw portion 23 of the stop 11 drops in an opposite direction to the direction indicated by the arrow G in FIG. 3 while the tip end always abuts against the link portion of the groove 17 of the shaft 3.

Afterwards, the stop 11 is pushed and then the tip end of the engagement claw portion 23 of the stop 11 reaches the engagement portion 18 on a boundary between the link portion and the penetrative portion of the groove 17 of the shaft 3. Then, the engagement claw portion 23 of the stop 11 being elastically deformed is elastically returned to its original state and then the tip ends of the four engagement claw portion 23 of the stop 11 elastically engage with the four engagement portions 18 of the shaft 3, respectively. When the tip ends of the engagement claw portions 23 of the stop 11 elastically engages with the four engagement portions 18 of the shaft 3, respectively, the tip ends of the four engagement claw portions 23 of the stop 11 does not disengage from the four engagement portions 18 of the shaft 3. In other words, the stop 11 does not disengage from the shaft 3.

In addition, the engaging stop portion 19 on each of the end faces of the penetrative portions of the four grooves 17 of the shaft 3 engagingly stop, respectively, at a portion on a circumferential side of the shaft 3 of the four engagement claw portions 23 of the stop 11.

As a result, as shown in FIG. 2 and FIG. 4, the stop 11 is fixed to the shaft 3. In addition, the spring 10 is fixed to the shaft 3 by means of the stop 11. In other words, the spring 10 is disposed at the periphery of the shaft 3 in a state in which the spring is compressed between the spring abutment portion 20 of the stop 11 and the washer 6 on the mount portion 12.

At this time, the abutment end faces 34 on the top and bottom of the spring 10 elastically abut, respectively, against the spring abutment portion 20 of the stop 11 and the annular line contact portion 50 of the abutment face 35 at an upper side of the washer 6. In addition, the annular line contact portion 50 of the abutment face 35 at a lower side of the washer 6 abuts in a state of annular line contact against the abutment face 33 of a washer receptacle portion of the mount portion 12. Further, the linear edge 601 of the washer 6 abuts against the abutment plane 301 of the shaft 3.

In this manner, the mirror assembly 4 is assembled to be able to tilt relative to the shaft 3 via the spring 10, the stop 11, the washer 6, and the positioning means 16, 22. Then, the shaft holder 14 that is integrated with the shaft 3 is fixed to the base 2 by means of the screw 15, whereby the door mirror 1 of the first embodiment is configured.

The door mirror 1 is equipped at a door D by fixing the base 2 to the door D. Then, the door mirror 1 is comprised of: the base 2 fixed to the door D of a vehicle body; the shaft 3; a fixing portion at the shaft holder 14 side; and the mirror unit 9; the mirror assembly 4 having the mirror unit 9, the mirror assembly being mounted to be able to tilt relative to the shaft 3; and a tilt portion at the mount portion 12 side.

The base 2 that is fixed to the door D of the vehicle body; the shaft 3; and the fixing portion at the shaft holder 14 side are always integrally fixed to the vehicle body. On the other hand, the mirror assembly 4 having the mirror unit 9, the mirror assembly being mounted to be able to tilt relative to the shaft 3, and the tilt portion at the mount portion 12 side tilt (rotate) around a rotational center O-O of the shaft 3 for the sake of buffering if either or both of them hits a person or an object.

The shaft holder 14 of the fixing portion and the mount portion 12 of the tilt portion are positioned in a use location A by means of the positioning recessed portion 16 and the positioning protrusive position 22. A tension is applied to the positioning recessed portion 16 and the positioning protrusive portion 22 so as to disable the positioning recessed portion 16 and the positioning protrusive portion 22 from being disengaged from each other due to a wind pressure at the time of running and then the mirror assembly 4 from tilting to the shaft 3, or alternatively, to disable a reflection face 8 of the mirror unit 9 of the tilt portion from being moved due to irregularities on a road surface at the time of running. The spring 10 is used to apply this tension. In other words, the positioning recessed portion 16 and the positioning protrusive portion 22 engage with each other due to a spring force of the spring 10 and then the mirror assembly 4 of the tilt portion is retained to be able to tilt with an appropriate retaining force so as not to be moved to the shaft 3 of the fixing portion.

The spring 10 is disposed at the periphery of the shaft 3 in a state in which the spring is compressed between the spring abutment portion 20 of the stop 11 and the washer 6 on the mount portion 12 by means of the stop 11 fixed to the shaft 3.

[Functional Description]

A vehicle outside mirror device in the first embodiment (a door mirror 1 of the first embodiment) is made of the constituent elements described above. Hereinafter, functions of the vehicle outside mirror device in the first embodiment (the door mirror 1 of the first embodiment) will be described.

A mirror assembly 4 of the door mirror 1 that is equipped at a door D by fixing a base 2 to the door D is positioned in a use location A. A backward direction of a vehicle can be visually recognized on a reflection face 8 of a mirror unit 9 of the mirror assembly 4 that is positioned in the use location A. At this time, a gap between a shaft holder 14 of a fixing portion and a mount portion 12 of a tilt portion is positioned in the use location A by means of a positioning recessed portion 16 and a positioning protrusive portion 22 engaging with each other. In addition, a spring force (a tension) of a spring 10 acts on the positioning recessed portion 16 and the positioning protrusive portion 22 so as to disable the mirror assembly 4 from unexpectedly tilting relative to a shaft 3 due to a wind pressure at the time of vehicle running, or alternatively, to disable a reflection face 8 of the mirror unit 9 from being unexpectedly moved due to irregularities of a road surface at the time of vehicle running.

In addition, if a remote control unit or a power unit (not shown) is driven, the mirror unit 9 can be turned in a longitudinal direction around a substantially horizontal shaft or in a transverse direction around a substantially vertical axis, whereby a position of the reflection face 8 of the mirror unit 9 can be adjusted in alignment with a driver's eye.

Next, the mirror assembly 4 that is positioned in the use location A is manually turned in the clockwise direction around the shaft 3 with a greater force than the spring force of the spring 10. Then, the positioning recessed portion 16 and the positioning protrusive portion 22 are disengaged from each other and then the mirror assembly 4 rotates in the clockwise direction around a rotational center O-O of the shaft 3. At this time, rotation of the mirror assembly 4 is guided by means of engagement between a stopper protrusive portion 29 and a stopper recessed portion 30.

When the mirror assembly 4 is positioned in a storage location B, the mirror assembly 4 is stored to be positioned in the storage location B while the engaged state is released. At this time, an end face 31 of the stopper protrusive portion 29 and an end face 32 of the stopper recessed portion 30 abut against each other; rotation of the mirror assembly 2 is restricted; and abutment between the mirror assembly 2 and the door D is avoided.

In addition, the mirror assembly 4 that is positioned in the storage location B is manually turned in the counterclockwise direction of the shaft 3 with a greater force than the spring force of the spring 10. Then, the positioning recessed portion 16 and the positioning protrusive portion 22 are disengaged with each other and then the mirror assembly 4 rotates in the counterclockwise direction around the rotational center O-O of the shaft 3. When the mirror assembly 4 is positioned in the use location A, the positioning recessed portion 16 and the positioning protrusive portion 22 having disengaged from each other engage again and then the mirror assembly 4 is positioned in the use location A.

On the other hand, the mirror assembly 4 that is positioned in the use location A is manually turned in the counterclockwise direction around the shaft 3 with a greater force than the spring force of the spring 10. Then, the positioning recessed portion 16 and the positioning protrusive portion 22 are disengaged from each other and then the mirror assembly 4 rotates in the counterclockwise direction around the rotational center O-O of the shaft 3. At this time, rotation of the mirror assembly 4 is guided due to engagement between the stopper protrusive portion 29 and the stopper recessed portion 30.

When the mirror assembly 4 is positioned at a forward tilt position C, the end face 31 of the stopper protrusive portion 29 and the end face 32 of the stopper recessed portion 30 abut against each other; rotation of the mirror assembly 2 is restricted; the mirror assembly 4 is positioned at the forward tilt position; and abutment between the mirror assembly 2 and the door D is avoided.

In addition, the mirror assembly 4 that is positioned at the forward tilt position C is manually turned in the clockwise direction around the shaft 3 with a greater force than the spring force of the spring 10. Then, the mirror assembly 4 rotates in the clockwise direction around the rotational center O-O of the shaft 3. When the mirror assembly 4 is positioned in the use location A, the positioning recessed portion 16 and the positioning protrusive portion 22 having disengaged with each other engage again and then the mirror assembly 4 is positioned in the use location A.

Then, if a greater force than the spring force of the spring 10 acts on the mirror assembly 4 that is positioned in the use location A, the mirror assembly 4 rotates for the sake of buffering in the clockwise direction or the counterclockwise direction around the rotational center O-O of the shaft 3 as in the manual rotation.

[Description of Advantageous Effect]

A vehicle outside mirror device in the first embodiment (a door mirror 1 of the first embodiment) is made of the constituent elements and functions described above. Hereinafter, advantageous effect of the vehicle outside mirror device in the first embodiment (the door mirror 1 of the first embodiment) will be described.

In the door mirror 1 of the first embodiment, a washer 6 is mounted on a shaft 3 to disable rotation around a rotational center O-O of the shaft 3 by means of an abutment plane 301 of a rotation stop portion of the shaft 3 and a linear edge 601 of a rotation stop portion of the washer 6, making it possible to stop the washer 6 from rotating around the rotational center O-O of the shaft 3. In other words, when a mirror assembly 4 rotates around the shaft 3, the washer 6 is fixed to the shaft 3 in a rotating direction and does not rotate. Thus, the door mirror 1 of the first embodiment slides between an abutment face 35 of the fixing washer 6 including a base 2, the shaft 3, and a spring 10 and an abutment face 33 of a mount portion 12 of the rotating mirror assembly 4 when the mirror assembly 4 rotates around the shaft 3, due to a synergetic effect between a function of an annular line contact portion 50 and a function of rotation stop portions 301, 601.

In particular, in the door mirror 1 of the first embodiment, among the abutment face 33 of the mount portion 12 at the mirror assembly 4 side and the abutment face 35 at a lower side of the washer 6, a respective one of which abut against each other, an annular line contact portion 50 is provided on the abutment face 35 of the washer 6. Thus, the abutment face 33 of the mount portion 12 at the mirror assembly 4 side and the abutment face 35 of the washer 6 abut against each other in a state of annular line contact, whereby a contact area between the abutment face 33 of the mount portion 12 at the mirror assembly 4 side and the abutment face 35 of the washer 6 can be reduced to its required minimum and then pseudo fixation due to intimate contact between the abutment face 33 of the mount portion 12 at the mirror assembly 4 side and the abutment face 35 of the washer 6 can be prevented. Therefore, when the mirror assembly 4 rotates around the shaft 3, the door mirror 1 of the first embodiment slides smoothly between the abutment face 35 of the fixing washer 6 including the base 2, the shaft 3, and the spring 10 or the like and the abutment face 33 of the mount part 12 of the rotating mirror assembly 4. As a result, the door mirror 1 of the first embodiment slides further reliably between the abutment face 35 of the fixing washer 6 including the base 2, the shaft 3, and the spring 10 or the like and the abutment face 33 of the mount portion 12 of the rotating mirror assembly 4 when the mirror assembly 4 rotates around the shaft 3, due to a synergetic effect between a function of rotation stop portions 301, 601 and a function of the annular line contact portion 50.

As a result, the door mirror 1 of the first embodiment does not slide between the spring 10 and a receiving face of the spring 10, i.e., between a spring abutment portion 20 of a stop 11 and the abutment face 35 at an upper side of the washer 6. Thus, in the door mirror 1 of the first embodiment, unlike the conventional outside mirror device described previously in which a coil spring slips on a plurality of evagination stripes on a receiving face of the coil spring, the spring 10 is not caught by the receiving face of the spring 10, i.e., the spring abutment portion 20 of a stop 11 and the abutment face 35 at the upper side of the washer 6 and generation of abnormal noise can be reliably prevented.

Moreover, in the door mirror 1 of the first embodiment, the abutment face 33 of the mount portion 12 of the mirror assembly 4 and the abutment face 35 of the washer 6 abut against each other in a state of annular line contact, by the annular line contact portion 50. Therefore, the door mirror can slide smoothly between the abutment face 33 of the mount portion 12 at the mirror assembly 4 side and the abutment face 35 of the washer 6 in comparison with the conventional vehicle outside mirror device described previously in which an abutment face of a mirror assembly and an abutment face of a washer abut against each other in a state of an unlimited number of point contacts due to surface texturing. As a result, the door mirror 1 of the first embodiment can prevent generation of abnormal noise further reliably and over a further long period of time. In other words, the door mirror 1 is excellent in durability.

In particular, in the door mirror 1 of the first embodiment, the annular line contact portion 50 is formed in an annular shape around a rotational center O-O of the mirror assembly 4 and the mirror assembly 4 is coincident in the rotating direction around the rotational center O-O of the shaft 3 and in the direction of the annular shape of the annular line contact portion 50, so that the mirror assembly 4 can rotate smoothly around the rotational center O-O of the shaft 3. Moreover, the annular line contact portion 50 is made of arc-shaped apexes while its center part is protruded outside in an arc shape, and therefore, a surface of the annular line contact portion 50 is smooth. As a result, the mirror assembly 4 can rotate smoothly around the rotational center O-O of the shaft 3.

In addition, in the door mirror 1 of the first embodiment, the annular line contact portion 50 is provided a respective one of the face 35, which abut against the abutment face 33 of the mount portion 12 of the mirror assembly 4 of the washer 6, and an opposite face 35 thereto, i.e., on each face 35 of the washer 6. Thus, when the washer 6 is assembled to the shaft 3 or the mount portion 12 of the mirror assembly 4 together with the spring 10, there is no assembling direction of the washer 6 (such as top and ground, top and bottom, or top face and back face); and therefore, assembling workability is improved in comparison with a washer having an annular line contact portion provided on one face thereof.

Further, in the door mirror 1 of the first embodiment, although not shown, a surface-textured surface, i.e., minute irregularity is provided on the abutment face 35 of the washer 6, so that the abutment face 33 of the mount portion 12 of the mirror assembly 4 and the abutment face 35 of the washer 6 abut against each other in a state of annular line contact by means of the annular line contact portion 50 and in a state of an unlimited number of point contacts due to surface texturing. As a result, the door mirror 1 of the first embodiment can slide further reliably between the abutment face 35 of the fixing washer 6 including the base 2, the shaft 3, and the spring 10 or the like and the abutment face 33 of the mount portion 12 of the rotating mirror assembly 4, due to a synergetic effect between the state of annular line contact by means of the annular line contact portion 50 and the state of an unlimited number of point contacts due to surface texturing, and generation of abnormal noise can be prevented further reliably and over a further long period of time. In other words, in the door mirror 1 of the first embodiment, a contact area between the abutment face 33 of the mount portion 12 of the mirror assembly 4 and the abutment face 35 of the washer 6 is reduced to its required minimum, whereby pseudo fixation due to intimate contact between the abutment face 33 of the mount portion 12 of the mirror assembly 4 and the abutment face 35 of the washer 6 can be prevented. Therefore, stable sliding can be achieved between the abutment face 35 of the fixing washer 6 including the base 2, the shaft 3, and the spring 10 or the like and the abutment face 33 of the mount portion 12 of the rotating mirror assembly 4.

Moreover, in the door mirror 1, rotation of the washer 6 around the rotational center O-O of the shaft 3 is stopped by means of an abutment plane 301 of a rotation stop portion of the shaft 3 and a linear edge 601 of a rotation stop portion of the washer 6. As a result, the door mirror 1 of the first embodiment can prevent generation of abnormal noise further reliably and over a further long period of time in comparison with the conventional vehicle outside mirror device described previously, the mirror device sliding between an abutment face of a mirror assembly and an abutment face of a washer, a respective one of which abuts against each other in a state of an unlimited number of point contacts due to surface texturing.

In addition, in the door mirror 1 of the first embodiment, a rotation stop portion is made of four linear edges 601 provided in an inner circumferential rim of a through hole 600 of the washer 6 and four abutment planes 301 that are provided on an outer circumferential face of the shaft 3. Thus, the linear edges 601 of the washer 6 abut against the abutment planes 301 of the shaft 3, thereby making it possible to stop the washer 6 from rotating around the rotational center O-O of the shaft 3. In this manner, in the door mirror 1 of the first embodiment, it is sufficient if: four linear edges 601 are provided at the inner circumferential rim of the through hole 600 of the washer 6; and four abutment planes 301 are provided on the outer circumferential face of the shaft 3. Therefore, a structure thereof is simple and manufacturing coat can be reduced accordingly.

[Description of a Need for Washer]

Hereinafter, a description will be given with respect to a need to interpose a washer 6 between an abutment face 33 of a mount portion 12 on a mirror assembly 4 side and an abutment end face 34 of a spring 10. In other words, when the mirror assembly 4 rotates around a shaft 3, there is a need to interpose the washer 6 in order for the abutment end face 34 of the spring 10 so as not to serve as a rotational slide face.

If the abutment end face 34 of the spring 10 serves as a rotational slide face without using the washer 6, the following failure can occur. In other words, sliding occurs between a spring abutment portion 20 of a stop 11, which is fixed to the shaft 3, and the abutment end face 34 of the spring 10. Thus, the spring abutment portion 20 of the stop 11 is chipped by the abutment end face 34 of the spring 10 that rotationally slides, or alternatively, abnormal noise such as a scratching noise is generated.

In addition, although the abutment end face 34 of the spring 10 is plane-ground, smooth plane finishing by means of manual finishing on a one-by-one item basis is not performed from the viewpoint of cost efficiency. Thus, there is a distortion in plane grinding of the abutment end face 34 of the spring 10, and hooking occurs at the time of sliding between the abutment face 33 of the mount portion 12 and the abutment end face 34 of the spring 10. In other words, a frictional state between the abutment face 33 of the mount portion 12 and the abutment end face 34 of the spring 10 is not stabilized. Thus, sliding occurs between the abutment face 33 of the mount portion 12 and the abutment end face 34 of the spring 10 or the spring 10 is distorted without sliding. If a torsional stress of the spring 10 is greater than a frictional force of hooking between the abutment face 33 of the mount portion 12 and the abutment end face 34 of the spring 10, distortion of the spring 10 is restored and then abnormal noise such as striking noise is generated from the spring 10.

Thus, there is a need to interpose the washer 6 between the abutment face 33 of the mount portion 12 at the mirror assembly 4 side and the abutment end face 34 of the spring 10 in such a manner that when the mirror assembly 4 rotates around the shaft 3, the washer 6 and the spring 10 are integrated with each other, thereby sliding between the abutment face 33 of the mount portion 12 and the abutment face 35 of the washer 6 so as not to cause the abutment end face 34 of the spring 10 to serve as a rotational slide face.

However, in reality, no sliding occurs between the abutment face 33 of the mount portion 12 and the abutment face 35 of the washer 6 and sliding occurs between the abutment face 35 of the washer 6 and the abutment end face 34 of the spring 10. Thus, there cannot be achieved an object of interposing the washer 6 so as not to cause the abutment end face 34 of the spring 10 to serve as a rotational slide face.

Hereinafter, a description will be given with respect to a cause of sliding between the abutment face 35 of the washer 6 and the abutment end face 34 of the spring 10 without sliding between the abutment face 33 of the mount portion 12 and the abutment face 35 of the washer 6. In other words, the foregoing cause is due to the fact that the abutment face 35 of the washer 6 is a plane like the abutment face 33 of the mount portion 12 (the plane on which the annular line contact portion 50 is not provided unlike the door mirror 1 of the first embodiment). In a case where the abutment face 35 of the washer 6 is a plane like the abutment face 33 of the mount portion 12, a coefficient of friction μ between the washer 6 made of a steel material and the mount portion 12 made of a resin is about 0.18 to about 0.3 (which depends on a resin material) and even if the coefficient of friction μ between the spring 10 made of a steel material and the washer 6 made of a steel material is on the order of about 0.45, as in the reality described above, sliding occurs between the abutment face of the washer 6 and the abutment end face 34 of the spring 10 with a great coefficient of friction without sliding between the abutment face 35 of the washer 6 and the abutment end face 34 of the spring 10 with a small coefficient of friction.

In other words, in a case where the abutment face 35 of the washer 6 is a plane, the abutment face 33 as a plane of the mount portion 12 and the abutment face 35 as a plane of the washer 6 are pressed in contact with each other (a load is applied), so that they absorb each other like a phenomenon that smooth faces of glasses adsorb each other when they are superimposed on each other. Thus, the fact that the abutment face 35 of the washer 6 is a plane is a cause of sliding between the abutment face 35 of the washer 6 and the abutment end face 34 of the spring 10 with a great coefficient of friction without sliding between the abutment face 35 of the washer 6 and the abutment face 33 of the mount portion 12 with a small coefficient of friction.

Therefore, as a measure for sliding between the abutment face 35 of the washer 6 and the abutment face 33 of the mount portion 12 without sliding between the abutment face 35 of the washer 6 and the abutment end face 34 of the spring 10, it is deemed that grease is applied between the abutment face 35 of the washer 6 and the abutment face 33 of the mount portion 12. In the case of the application of grease, there is a problem on assembling tact due to the application of grease and higher cost such as grease cost, there is a problem of grease leakage or the like, and there is a problem of performance degradation of parts due to the application of grease or the like.

Therefore, according to the present invention, i.e., according to the door mirror 1 of the first embodiment, an annular line contact portion 50 is provided on the abutment face 35 of the washer 6 while a center part of the abutment face 35 of the washer 6 is shaped to be increased in thickness so as not to cause the abutment face 35 of the washer 6 to serve as a plane. As a result, in the door mirror 1 of the first embodiment, a phenomenon of plane adsorption does not occur between the annular line contact portion 50 of the abutment face 35 that is not a plane of the washer 6 and the abutment face 33 that is a plane of the mount portion 12. Thus, sliding occurs between the annular line abutment portion 50 of the abutment face 35 that is not a plane of the washer 6 and the abutment face 33 of the mount portion 12 and no sliding occurs between the annular line contact portion 50 of the abutment face 35 that is not a plane of the washer 6 and the abutment end face 34 of the spring 6. In this manner, as described above, the door mirror 1 of the first embodiment can prevent generation of abnormal noise reliably.

Moreover, in the door mirror 1 of the first embodiment, the abutment face 35 of the washer 6 does not become a plane because of provision of the annular line contact portion 50, thus making it possible for the mirror to reliably slide between the abutment face 35 of the washer 6 and the abutment face 33 of the mount portion 12 and disabling reliable sliding between the abutment face 35 of the washer 6 and the abutment end face 34 of the spring 10. As a result, intimate contact between the washer and the mirror side and the door mirror is actuated with a coefficient of friction specific to an essential material. Thus, in the door mirror 1 of the first embodiment, there is no need to apply grease between the abutment face 35 of the washer 6 and the abutment face 33 of the mount portion 12. Therefore, assembling tact is improved in comparison with the case of applying grease, and grease cost or the like is eliminated, resulting in lower cost; no grease leakage or the like occurs; or alternatively, no performance degradation of parts or the like due to the application of grease occurs.

[Description of Modification Example of Washer]

FIG. 11(A), FIG. 11(B), and FIG. 11(C) are explanatory views each showing a modification example of a washer. A washer 60 of this modification example is a washer of which cross section is formed in a circular (or elliptical) shape. The apexes that are formed in the sectional circular (or elliptical) shape of the washer 60 constitute an annular line contact portion 51. In this washer 60, the annular line contact portion 51 conveniently serves as an abutment face 35 of the washer 6.

FIG. 12(A), FIG. 12(B), and FIG. 12(C) are explanatory views each showing a modification example of a washer. A washer 61 of this modification example is a washer having a rib at each end part. In other words, the sectional shape in a radial direction of the washer 61 is formed in a shape in which a substantially semicircular rib is provided at each end part (an end part of an inner circumferential rim side and an end part of an outer circumferential rim side) of each abutment face 35. The apexes of this semicircular rim form an annular line contact portion 52. In the washer shown in FIG. 12(A), FIG. 12(C), and FIG. 12(C), the annular line contact potion 52 on the abutment face 35 is provided by two stripes (two pieces), so that friction can be reduced to ½ in comparison with the washer 60 shown in FIG. 11(A), FIG. 11(B), and FIG. 11(C) described previously in which the annular line contact portion 51 on the abutment face 35 is provided by one stripe (one piece).

FIG. 13(A), FIG. 13(B), and FIG. 13(C) are explanatory views each showing a modification example of a washer. A washer 62 of this modification example is a washer of which cross section is formed in a circular (or elliptical) shape. The apexes of the sectional circular (elliptical) shape of the washer 62 form an annular line contact portion 53. In this washer 62, the annular line contact portion 53 is employed as an abutment face of the washer for the sake of convenience.

In a washer 60 shown in FIG. 11, a washer 61 shown in FIG. 12, and a washer 62 shown in FIG. 13, as in a washer 6 shown in FIG. 10, four linear edges 601 are provided at an inner circumferential rim of a through hole 600 of each of the washers 60, 61, 62. In the washer 60 shown in FIG. 11, the washer 61 shown in FIG. 12, and the washer 62 shown in FIG. 13, as in the washer 6 shown in FIG. 10, a surface-textured surface (not shown) may be provided on each abutment face 35 including the annular line contact portions 51, 52, 53. The washer 60 shown in FIG. 11, the washer 61 shown in FIG. 12, and the washer 62 shown in FIG. 13 can achieve functions and advantageous effects which are substantially identical to those of the washer 6 shown in FIG. 10.

[Description of Modification Example of Rotation Stop Portion]

Figure 14:
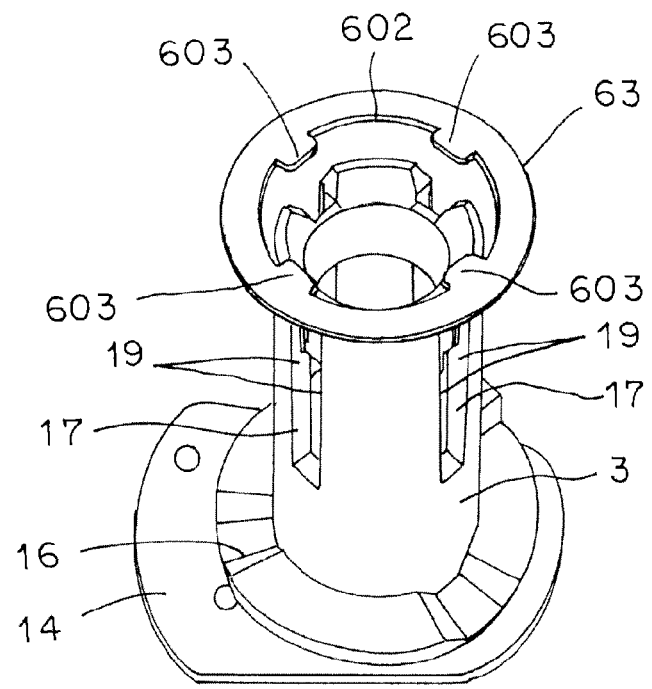
FIG. 14 is a partially perspective view showing a modification example of a rotation stop portion before mounting the rotation stop portion formed of an engagement protrusive portion of a washer and a rim of a groove of a shaft, similarly.
Figure 15:
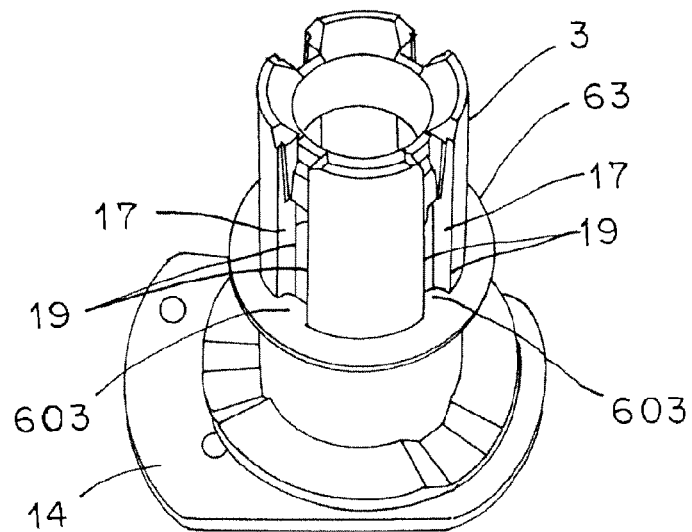
FIG. 15 is a partially perspective view showing a modification example of a rotation stop portion after mounting the rotation stop portion formed of an engagement protrusive portion of a washer and a rim of a groove of a shaft, similarly.

FIG. 14 and FIG. 15 are partially perspective views each showing a modification example of a rotation stop portion. Hereinafter, the rotation stop portion in this modification example will be described.

In other words, a substantially circular through hole 602 for engagement with the shaft 3 is provided in a washer 63. At an inner circumferential rim of the through hole 602 of the washer 63, at least one engagement protrusive portion, four engagement protrusive portions 603 in this example, engaging with a rim of the groove 17 of the shaft 3, i.e., the engaging stop portion 19, are integrally provided toward a center of the washer 63. The engagement protrusive portion 603 of the washer 63 and the rim of the groove 17 of the shaft 3, i.e., the engagingly stop portion 19 configure the rotation stop portion in this modification example.

According to the rotation stop portion in this modification example, the engagement protrusive portion 603 of the washer 63 engages with the rim of the groove 17 of the shaft 3, i.e., the engagingly stop portion 19, thereby making it possible to stop the washer 63 from rotating around a rotational center O-O of the shaft 3. Moreover, according to the rotation stop portion in this modification example, an engagement claw portion 23 of a stop 11 engages with the rim of the groove 17 of the shaft 3, i.e., the engagingly stop portion 19, whereby a spring 10 is disposed in a state in which the spring is compressed between the washer 63 and the stop 11. In this manner, according to the rotation stop portion in this modification example, the rim of the groove 17 of the shaft 3, i.e., the engaging stop portion 19 serves as both of an engagement portion with which the engagement claw portion 23 of the stop 11 engages and an engagement portion with which the engagement protrusive portion 603 of the washer 63 engages. Thus, a structure thereof becomes simple and manufacturing cost can be reduced accordingly.

Figure 16:
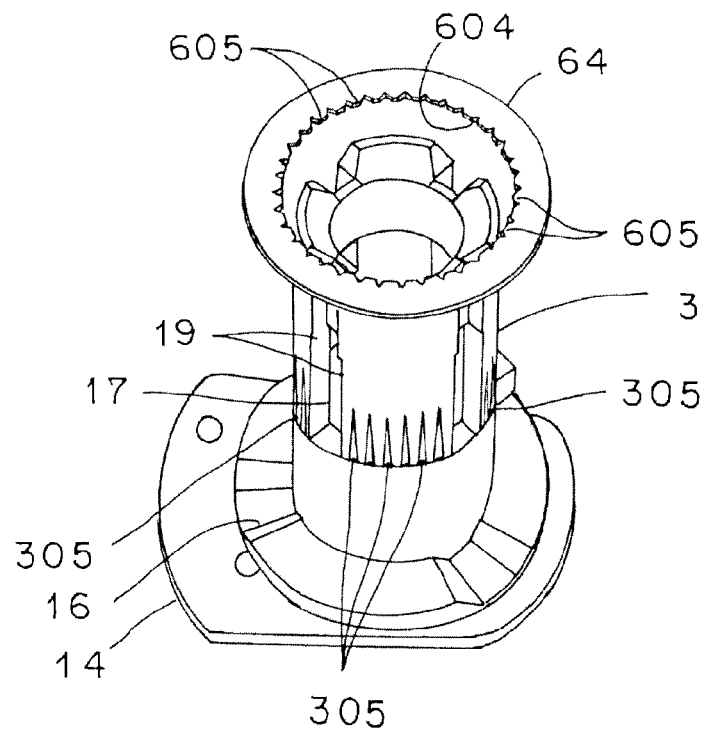
FIG. 16 is a partially perspective view showing a modification example of a rotation stop portion before mounting the rotation stop portion formed of a number of small engagement protrusive portions or a number of small engagement recessed portions of a washer and a number of engagement recessed portions or a number of engagement protrusive portions of a shaft, similarly.
Figure 17:
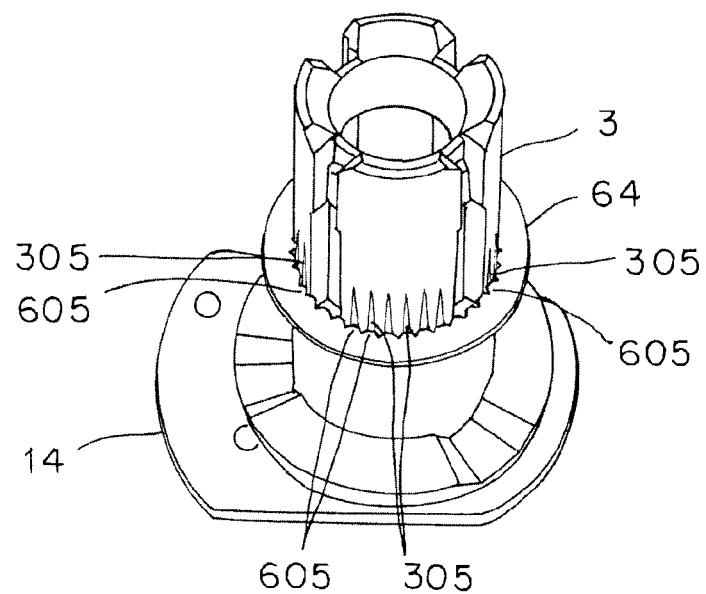
FIG. 17 is a partially perspective view showing a modification example of a rotation stop portion after mounting the rotation stop portion formed of a number of small engagement protrusive portions or a number of small engagement recessed portions of a washer and a number of engagement recessed portions or a number of engagement protrusive portions of a shaft, similarly.

FIG. 16 and FIG. 17 are partial perspective view each showing a modification example of a rotation stop portion. Hereinafter, the rotation stop portion in this modification example will be described.

In other words, a substantially circular through hole 604 for engagement with the shaft 3 is provided at a washer 64. A number of small engagement protrusive portions (or a number of small engagement recessed portions) 605 are provided at an inner circumferential rim of the through hole 604 of the washer 64. On an outer circumferential face of the shaft 3, a number of small recessed portions (or a number of small engagement protrusive portions. so called serrations or splines) 305 with which a number of the small engagement protrusive portions (or a number of small engagement recessed portions) 605 engage, respectively, are provided in an axial direction of the shaft 3. A number of the small engagement protrusive portions (or a number of small recessed portions) 605 of the washer 64 and a number of the small engagement recessed portions (or a number of small engagement protrusive portions) 305 of the shaft 3 configure the rotation stop portion in this modification example.

According to the rotation stop portion in this modification example, a number of small engagement protrusive portions (or a number of small engagement recessed portions) 605 of the washer 64 is engaged with a number of small engagement recessed portions (or a number of small engagement protrusive portions) 305 of the shaft 3, thereby making it possible to stop the washer 64 from rotating around the rotational center O-O of the shaft 3. In this manner, according to the rotation stop portion in this modification example, a number of small engagement protrusive portions (or a number of small engagement recessed portions) 605 are provided at an inner circumferential face of the washer 64, whereas a number of small engagement recessed portion (or a number of small engagement protrusive portions) 305 are provided in an axial direction of the shaft on an outer circumferential rim of the through hole 604 of the washer 64. Thus, when the washer 64 is assembled to the shaft 3, there is no need for positioning between the shaft 3 and the washer 64 (such as positioning in rotating direction or circumferential direction around rotational center O-O of shaft 3). Therefore, assembling workability is improved and manufacturing cost can be reduced accordingly.

In the washer 63 shown in FIG. 14 or FIG. 15 and the washer 64 shown in FIG. 16 or FIG. 17, as in the washer 6 shown in FIG. 10, a sectional shape in a radial direction is formed in a shape in which a center part is protruded in an arc shape outside relative to each end part. The apexes of this arc shape form a annular line contact portion 50 or like the washer 60 shown in FIG. 11, the apexes of a rib of this semicircle form an annular line contact portion 51, or like the washer 61 shown in FIG. 12, a sectional shape in a radial direction is formed in a shape in which a semicircular rib is provided at each end part, the apexes of this semicircular rib form an annular line contact portion 52, or like the washer 62 shown in FIG. 13, in a sectional circular (or elliptical) shape, the apexes of sectional circular (or elliptical) shape form an annular line contact portion 53 and then an engagement protrusive portion 603 and a number of small engagement protrusive portions (or a number of small engagement recessed portions) 605 serving as a rotation stop portion are provided.

Second Embodiment

FIG. 18 to FIG. 22 show a second embodiment of a vehicle outside mirror device according to the present invention. FIG. 19(A) and FIG. 19(B) are a perspective view and a partially enlarged perspective view of a washer of which center part is shaped to be increased in thickness. FIG. 20(A) and FIG. 20(B) are a perspective view and a partially enlarged perspective view of a washer having a rib at a center part thereof. FIG. 21(A) and FIG. 21(B) are a perspective plan view and a partially enlarged perspective view of a washer having a rib at each end part thereof. FIG. 22(A) and FIG. 22(B) are a perspective view and a partially enlarged perspective view of a washer of which cross section is formed in a circular (or elliptical) shape. In the figures, like reference numerals shown in FIG. 1 to FIG. 17 designate like constituent elements.

The door mirror 1 of the first embodiment described previously is a door mirror in which a rotation stop portion (the rotation stop portion comprised of an abutment plane 301 of a shaft 3 and a linear edge 601 of washers 6, 60, 61, 62) is provided, whereas the vehicle outside mirror device in the second embodiment (a door mirror of the second embodiment) is a door mirror in which a rotation stop portion is not provided.

Figure 18:
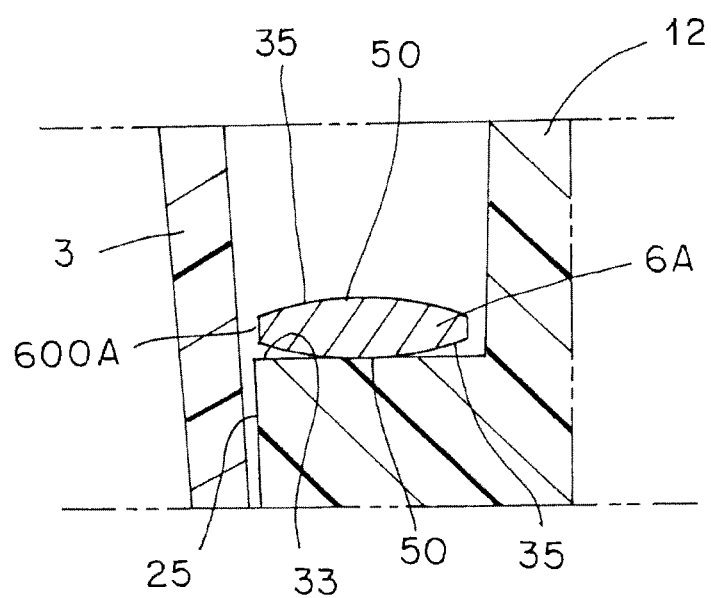
FIG. 18 is a partially enlarged longitudinal cross section (a partially enlarged vertical cross section of an assembling state between a mount portion and a washer of a mirror assembly showing a second embodiment of a vehicle outside mirror device according to the present invention.
Figure 19:
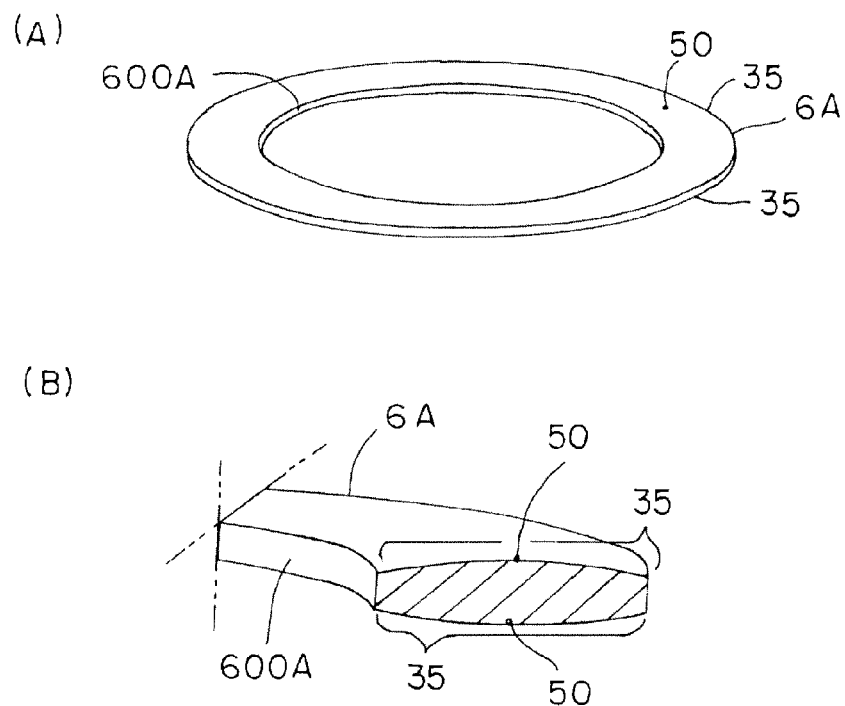
FIG. 19 is a perspective view and a partially enlarged perspective view showing a washer of which center part is shaped to be thickened, similarly.

In other words, the washer 6A shown in FIG. 18 and FIG. 19 is a washer of which center part is shaped to be increased in thickness in a manner which is substantially similar to that of the washer 6 shown in FIG. 10. In other words, the sectional shape in a radial direction of the washer 6A is formed in a shape in which a center part thereof is protruded in an arc shape to the outside relative to each end part on each abutment face 35 of the washer 6A. This arc-shaped apexes form an annular line contact portion 50. A surface-textured surface (not shown) is provided on each abutment face 35 including the annular line contact portion 50 of the washer 6A. In addition, at a center of the washer 6A, a circular through hole 600A is provided, and a linear edge serving as a rotation stop portion is not provided.

Figure 20:
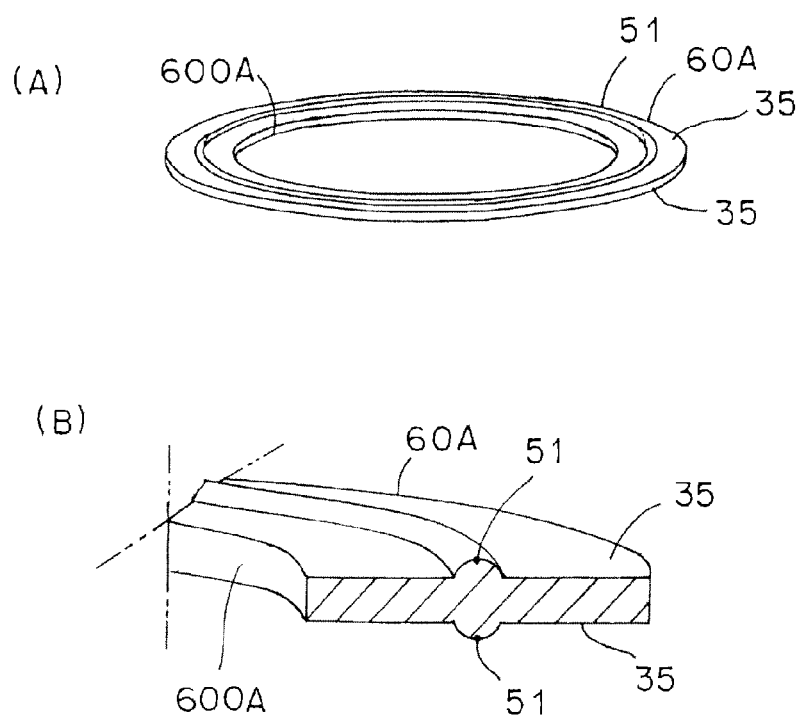
FIG. 20 is a partially enlarged perspective view showing a modification example of a washer, the washer having a rib provided at a center part thereof, similarly.

The washer 60A shown in FIG. 20 is a washer having a rib at a center part thereof in a manner which is substantially similar to that of the washer 60 shown in FIG. 11. In other words, the sectional shape in a radial direction of the washer 60A is formed in a shape in which a substantially semicircular rib is provided at a center part of each abutment face 35 of the washer 60A. The apexes of this semicircular rib form an annular line contact portion 51. A surface-textured surface (not shown) may be provided on each abutment face 35 including the annular line contact portion 51 of the washer 60A. In addition, at a center of the washer 60A, a circular through hole 600A is provided, and a linear edge serving as a rotation stop portion is not provided.

Figure 21:
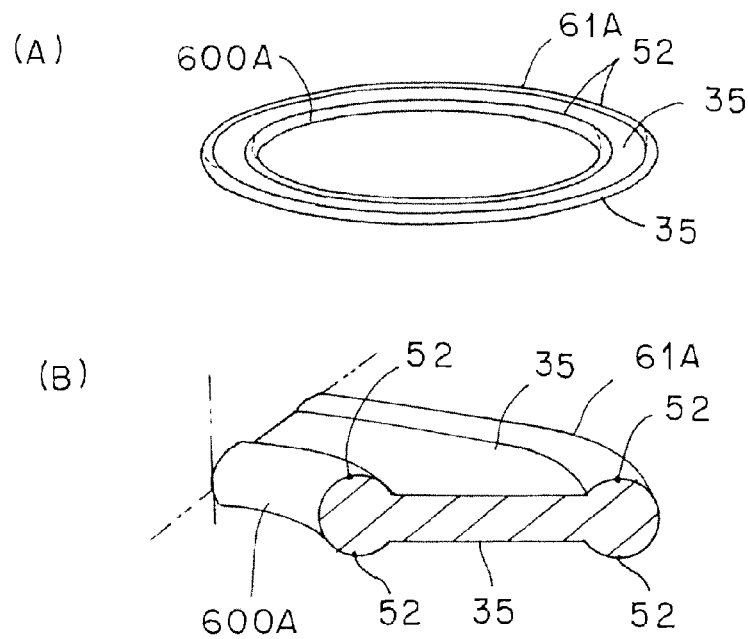
FIG. 21 is a partially enlarged perspective view showing a modification example of a washer, the washer having a rib provided at each end part thereof, similarly.

A washer 61A shown in FIG. 21 is a washer having a rib at a center part thereof in a manner which is substantially similar to that of the washer 61 shown in FIG. 12. In other words, the sectional shape in a radial direction of the washer 61A is formed in a shape in which a substantially semicircular rib is provided at a center part of each abutment face 35 of the washer 61A. The apexes of this semicircular rib form an annular line contact portion 52. A surface-textured surface (not shown) may be provided on each abutment face 35 including the annular line contact portion 52 of the washer 61A. In addition, at a center of the washer 61A, a circular through hole 600A is provided, and a linear edge serving as a rotation stop portion is not provided.

Figure 22:
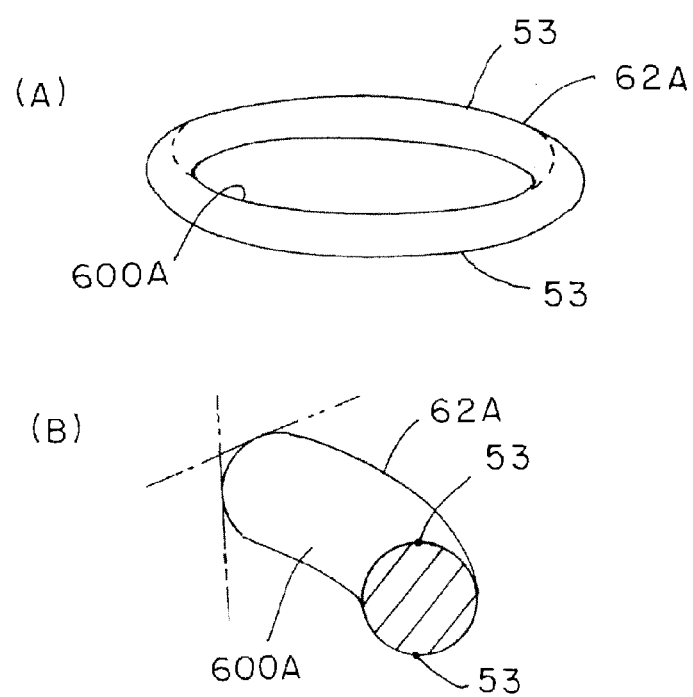
FIG. 22 is a partially enlarged perspective view showing a modification example of a washer of which cross section is formed in a circular (or elliptical) shape, similarly.

A washer 62A shown in FIG. 22 is a washer of which cross section is shaped in a circular (or elliptical) shape in a manner which is substantially similar to that of the washer 62 shown in FIG. 13. The apexes of the sectional circular (or elliptical) shape of the washer 62A form an annular line contact portion 53. A surface-textured surface (not shown) may be provided on each abutment face including the annular line contact portion 53 of the washer 62A. In addition, in this washer 62A, the annular line contact portion 53 is employed as a washer abutment face for the same of convenience. Further, at a center of the washer 62A, a circular through hole 600A is provided, and a linear edge serving as a rotation stop portion is not provided.

In the washer 6A shown in FIG. 18 and FIG. 19, the washer 60A shown in FIG. 20, the washer 61A shown in FIG. 21, and the washer 62A shown in FIG. 22, an inner diameter of the circular through hole 600A is greater than an outer diameter of the shaft 3, so that these washers can be loosely engaged with the shaft 3 (in other words, a state of engagement from the outside in a state in which a gap is provided between an inner circumferential face of the washer 6 and an outer circumferential face of the shaft 3).

The door mirror of the second embodiment (the washer 6A shown in FIG. 20, the washer 61A shown in FIG. 21, and the washer 62A shown in FIG. 22) can prevent pseudo fixation due to intimate contact between the abutment face 33 of the mirror assembly 4 and the abutment face 35 of the washer 6 by means of the annular line contact portions 50, 51, 52, 53. As a result, in the door mirror of the second embodiment, generation of abnormal noise can be reliably prevented by means of abutment between an abutment plane of a rotation stop portion of the shaft 3 and a linear edge of a rotation stop portion of the washers 6A, 60A, 61A, 62A, even if the washers 6A, 60A, 61A, 62A are not mounted on the shaft 3 to disable rotation around a rotational center of the shaft 3.

In particular, in the door mirror of the second embodiment, although the washer 6A, 60A, 61A, 62A are not fixed to the shaft 3, there is no need to provide a rotation stop portion (a linear edge 601, an abutment plane 301, an engagement protrusive portion 603, a number of small engagement protrusive portions (or a number of small engagement recessed portions) 605, or a number of small engagement recessed portions (or a number of small engagement protrusive portions) 305) on the washer 6A, 60A, 61A, 62A and the shaft 3. As a result, in the door mirror of the second embodiment, when the washers 6A, 60A, 61A, 62A are assembled to the shaft 3, there is no need for positioning between the shaft 3 and the washers 6A, 60A, 61A, 62A (such as positioning in rotating direction or circumferential direction around rotational center of shaft 3). Therefore, assembly workability is improved, assembling work time can be reduced, and manufacturing cost can be reduced accordingly.

Third embodiment

Figure 23:
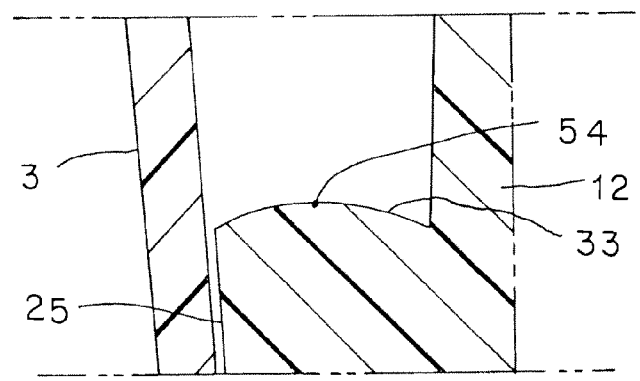
FIG. 23 is a partially enlarged longitudinal cross section (a partially enlarged vertical cross section) of an assembling state between a mount portion (a mount potion of which center part is shaped to be increased in thickness) and a washer, showing a third embodiment of a vehicle outside mirror device according to the present invention.
Figure 24:
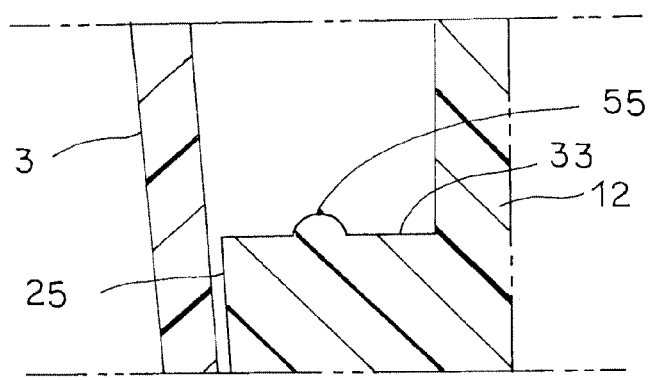
FIG. 24 is a partially enlarged longitudinal cross section (a partially enlarged vertical cross section) of a modification example showing a mount portion, the mount portion having a rib provided at a center part of an abutment face, similarly.
Figure 25:
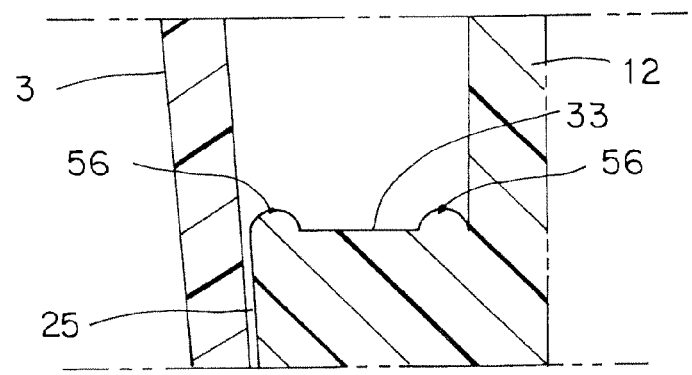
FIG. 25 is a partially enlarged longitudinal cross section (a partially enlarged vertical cross section) of a modification example showing a mount portion, the mount portion having a rib provided at each end part of an abutment face, similarly.
Figure 26:
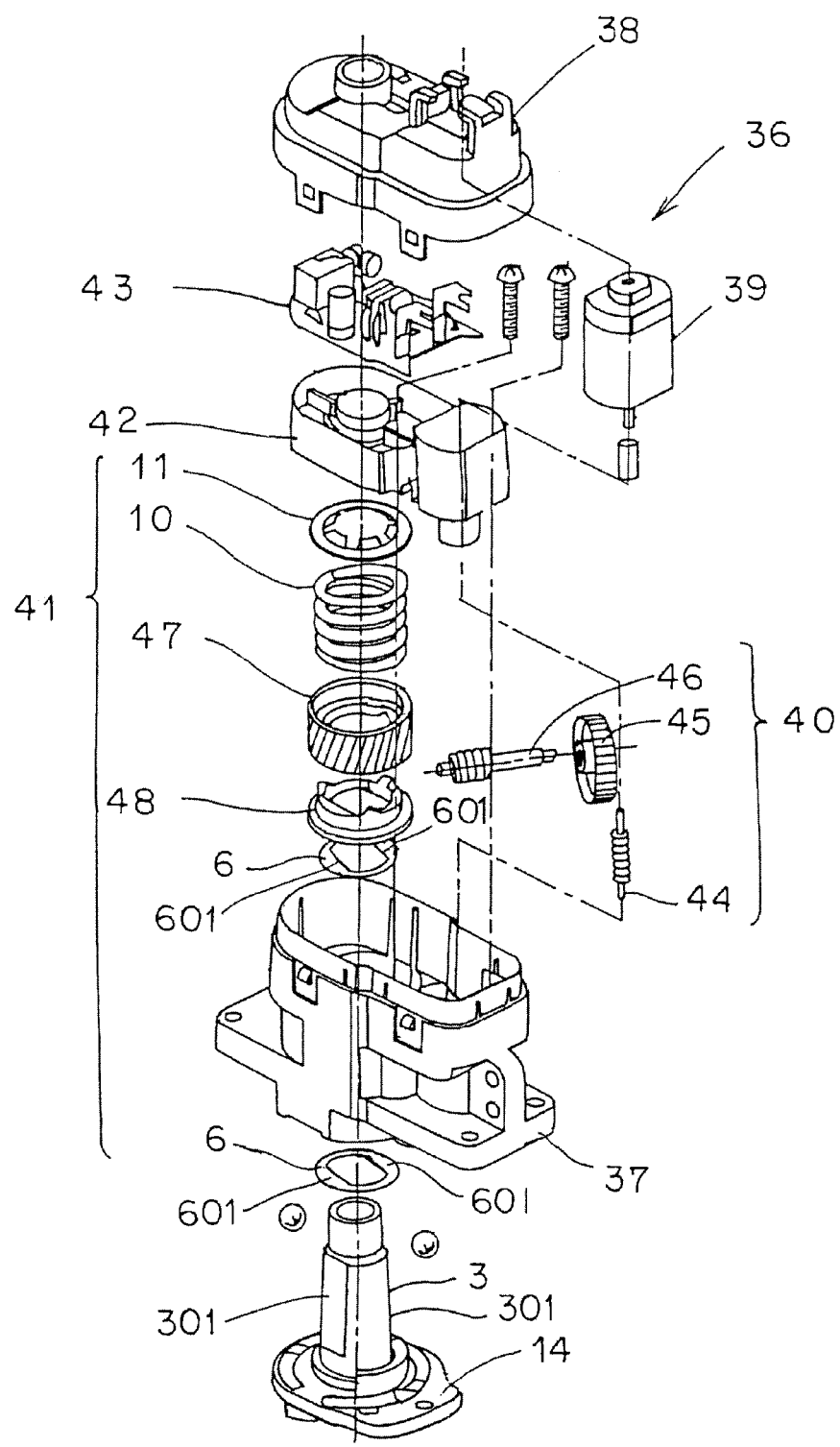
FIG. 26 is an exploded perspective view of an electrically drive storage unit, a shaft, and a washer, showing a fourth embodiment of a vehicle outside mirror device according to the present invention.

FIG. 23 to FIG. 25 show a third embodiment of a vehicle outside mirror device according to the present invention. In the figures, like reference numerals shown in FIG. 1 to FIG. 22 designate like constituent elements.

The door mirror 1 of the first embodiment and the door mirror of the second embodiment, described previously, are the ones in which annular line contact portions 50, 51, 52, 53 are provided on the abutment faces 35 of the washers 6, 60, 61, 62, 63, 64, 6A, 60A, 61A, 62A, the vehicle outside mirror device in the third embodiment (the door mirror of the third embodiment) is the one in which annular line contact portions 54, 55, 56 are provided on an abutment face 33 of a mount portion 12 at a mirror assembly 4 side.

In other words, in FIG. 23, the sectional shape in a radial direction around a rotation center O-O of a shaft 3 of the mount portion 12 is formed in a shape in which a center part thereof is protruded in an arc shape to the outside relative to each end part thereof on the abutment face 33 of the mount portion 12. The apexes of this arc shape form the annular line contact portion 54.

In FIG. 24, the sectional shape in a radial direction around the rotational center O-O of the shaft 3 of the mount portion 12 is formed in a shape in which a substantially semicircular rib is provided at a center part of the abutment face 33 of the mount portion 12. The apexes of this semicircular rib form the linear line contact portion 55.

In FIG. 25, the sectional shape in a radial direction around the rotational center O-O of the shaft 3 of the mount portion 12 is formed in a shape in which a substantially semicircular rib is provided at each end part of the abutment face 33 of the mount portion 12. The apexes of this semicircular rib form the circular line contact portion 56.

The door mirror of the third embodiment can achieve functions and advantageous effects which are substantially similar to those of the door mirror 1 of the first embodiment and the door mirror of the second embodiment, described previously. In the door mirror of the third embodiment, there may be used the washer 6, 60, 61, 62, 63, 64 of the door mirror 1 of the first embodiment; the washer 6A, 60A, 61A, 62A of the door mirror of the second embodiment; and an ordinary washer, each abutment face of which is formed in the shape of a plane (not shown).

Fourth embodiment

FIG. 26 to FIG. 29 each show a fourth embodiment of a vehicle outside mirror device according to the present invention. In the figures, like reference numerals shown in FIG. 1 to FIG. 25 designate like constituent elements. Hereinafter, the vehicle outside mirror device in the fourth embodiment will be described.

While, in the first, second, and third embodiments described previously, there were provided a vehicle outside mirror device of manual storage type in which a mirror assembly 4 is manually tilted (rotated or turned) between a use location A and a storage location B relative to a shaft 3, the vehicle outside mirror device in the fourth embodiment is directed to a vehicle outside mirror device of electrically driven storage type in which a mirror assembly 4 is tilted (rotated or turned) between a use location A and a storage location B relative to the shaft 3 by electrically driving the mirror assembly.

The vehicle outside mirror device in the fourth embodiment is provided with an electrically driven storage unit 36 for tilting (rotating or turning) the mirror assembly 4 between the use location A and the storage location B relative to the shaft 3 by electrically driving the mirror assembly 4. The electrically driven storage unit 36 is provided with: the shaft 3; a shaft holder 14; a gear case 37 and a cover 38 serving as casing; a deceleration mechanism 40 and a clutch mechanism 41 serving as a rotation force transmission mechanism; a plate 42; and an electric circuit board 43. The gear case 37 is equivalent to the mount portion 12 of the first embodiment described previously.

The deceleration mechanism 40 is comprised of: a first worm gear 44 serving as a first step gear linked with the motor 39; a helical gear 45 serving as a second step gear which is meshed with the first worm gear 44; a second worm gear 46 serving as a third step gear rotating in synchronism with the helical gear 45; and a clutch gear 47 serving as a final step gear with which the second worm gear 46 is meshed.

The clutch mechanism 41 is provided with the clutch gear 47, a clutch holder 48, a spring 10, a stop 11, and a washer 6. The clutch mechanism 41 is configured by sequentially engaging the washer 6 and the gear case 37 at a lower side with the shaft 3 and then sequentially engaging the washer 6, the clutch holder 48, the clutch gear 47, and the spring 10 at an upper side to establish the spring 10 in a compressed state by means of the stop 11.

An annular line contact portion 50 of an upper abutment face 35 of the lower washer 6 and a lower abutment face 49 of a washer receptacle portion of the gear case 37 abut against each other. In addition, a circular line contact portion 50 of a lower abutment face 35 of the upper washer 6 and an upper abutment face 49 of a washer receptacle portion of the gear case 37 abut against each other. Further, a linear edge 601 of the washer 6 at each of the upper and lower sides abuts against an abutment plane 301 of the shaft 3.

According to the vehicle outside mirror device in the fourth embodiment, when a motor 30 is driven, a clutch gear 47 and a clutch holder 48 are engaged with each other and then a mirror assembly 4 tilts (rotates or turns) between a user position A and a storage location B around a shaft 3 by electrically driving the mirror assembly 4. In addition, when the mirror assembly 4 is manually rotated around the shaft 3, the clutch gear 47 and the clutch holder 48 are disengaged from each other and then the mirror assembly 4 tilts (rotates or turns) between the use location A and the storage location B and between the use location A and a forward tilt position C. Further, if a greater force than a spring force of a spring 10 acts on the mirror assembly 4 positioned in the use location A, the clutch gear 47 and the clutch holder 48 are disengaged from each other and then the mirror assembly 4 rotates for the sake of buffering in the clockwise direction or in the counterclockwise direction around the rotational center O-O of the shaft 3 in a manner similar to that of the manual rotation described previously. In other words, the mirror assembly 4 tilts (rotates or turns) around the shaft 3 between the use location A and the storage location B and between the use location A and the forward tilt position C.

Figure 27:
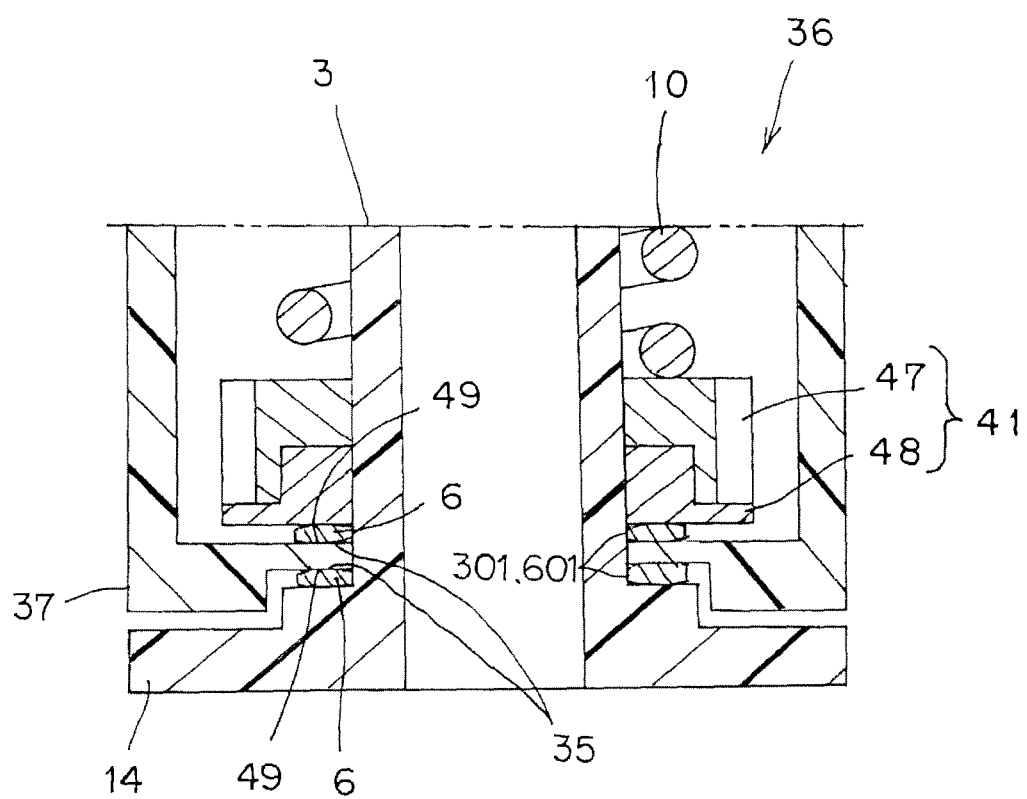
FIG. 27 is a partially enlarged longitudinal cross section (a partially enlarged vertical cross section) showing an electrically driven storage unit, a shaft, and a washer, similarly.

The vehicle outdoor mirror device in the fourth embodiment can achieve functions and advantageous effects which are substantially similar to those of the vehicle outside mirror devices in the first, second, and third embodiments, described previously, in both of electrically driving and manual driving. In other words, as shown in FIG. 27, this mirror device slides between the abutment face 35 on a bottom face of an upper washer 6 and a top face of a gear case 37 and between an abutment face 35 on a top face of a lower washer 6 and a bottom face of the gear case 37, and thus, the mirror device does not slide between an abutment face 35 on the top face of the upper washer 6 and a bottom face of the clutch holder 48 and between a bottom face of the lower washer 6 and a bottom face of the shaft holder 14. As a result, according to the vehicle outside mirror device in the fourth embodiment, striking noise of the spring 10 and undulation of an electrically driven actuation noise due to a slide change are reduced, thus improving quality.

In the vehicle outside mirror device of the fourth embodiment, there may be used the washers 60, 61, 62, 63, 64, 6A, 60A, 61A, 62A in the vehicle outside mirror of the first and second embodiments, described previously; there may be used an engagement protrusive portion 603 of a rotation stop portion of a washer 63 and a rim, i.e., an engagingly stop portion 19 of a groove 17 of a rotation stop portion of the shaft 3 in the vehicle outside mirror device shown in FIG. 14 and FIG. 15; or alternatively, there may be used a number of small engagement protrusive portions (or a number of small engagement recessed portions) 605 of the rotation stop position of the washer 64 and a number of small engagement recessed portions (or a number of small engagement protrusive portions) 305 of the rotation stop portion of the shaft 3 in the vehicle outside mirror shown in FIG. 16 and FIG. 17.

Figure 28:
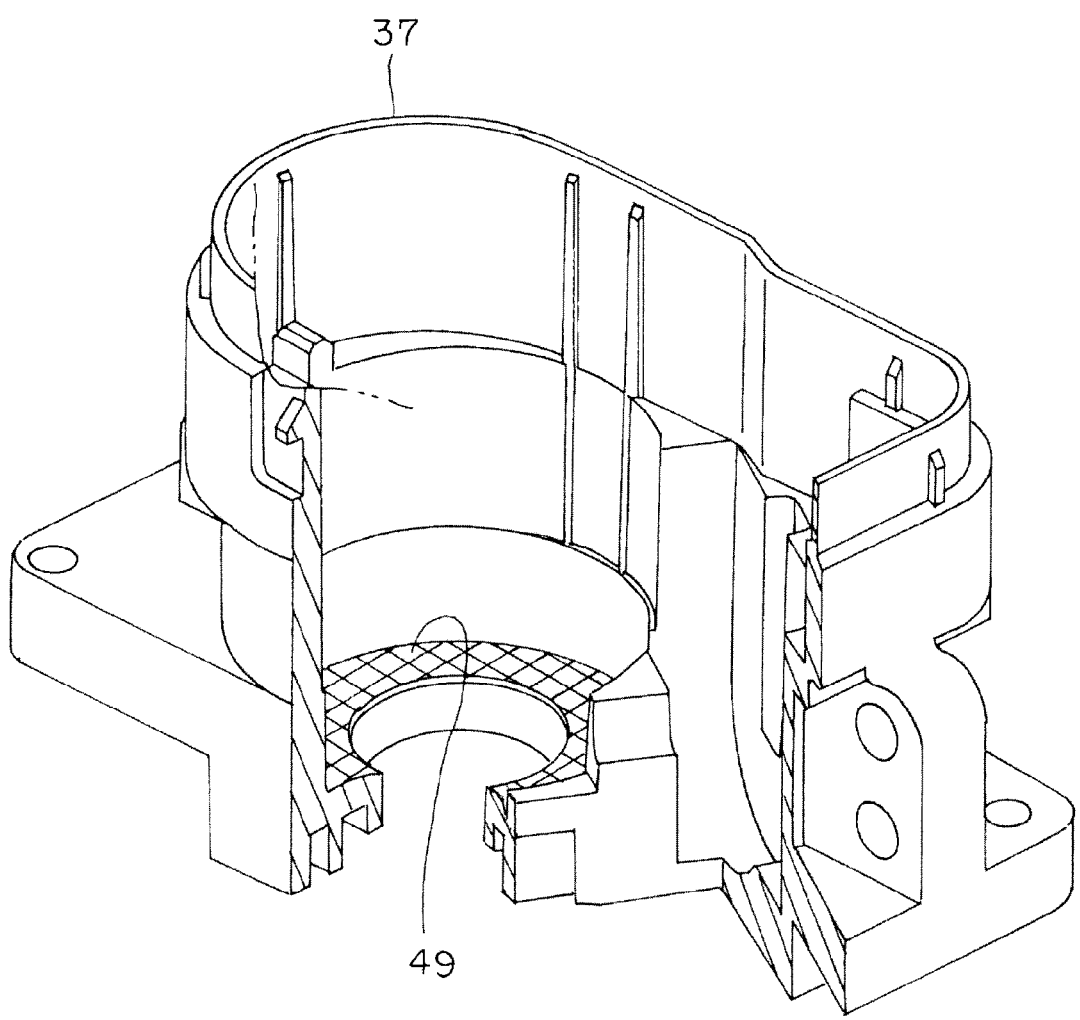
FIG. 28 is a partially perspective view showing that a gear case of the electrically driven storage unit is seen from an oblique top, similarly.
Figure 29:
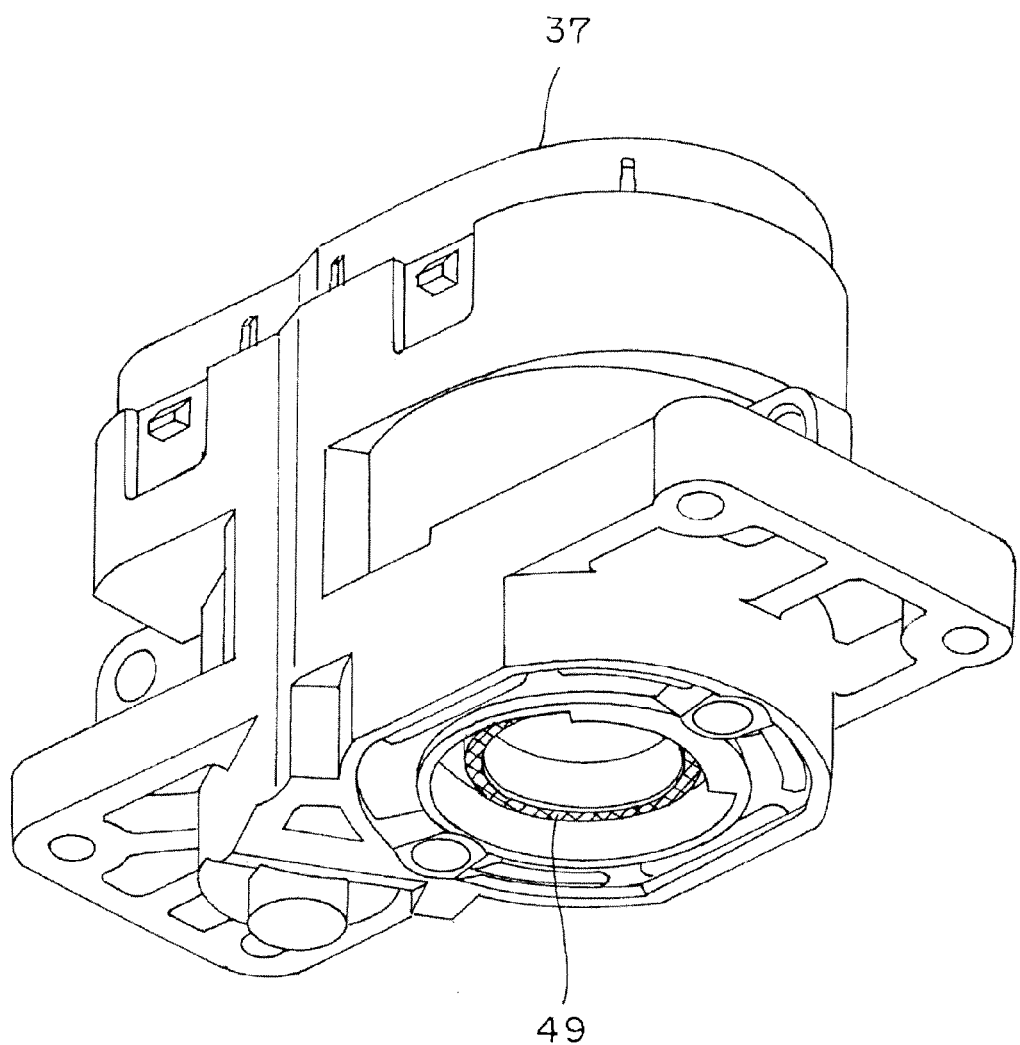
FIG. 29 is a perspective view showing that the gear case of the electrically driven storage unit is seen from an obliquely bottom, similarly.

In addition, in the vehicle outside mirror device of the fourth embodiment, annular line contact portions 54, 55, 56 in the vehicle outside mirror device of the third embodiment may be provided on an abutment face 49 of at least either one of top and bottom abutment faces of the gear case 37 (the faces to which lattice hatching in FIG. 28 and FIG. 29 is applied). In this case, there may be used: the washers 6, 60, 61, 62, 63, 64 of the door mirror 1 of the first embodiment; washers 6A, 60A, 61A, 62A of the second embodiment; and an ordinary washer (not shown), each abutment face of which is formed in the shape of a plane.

Fifth Embodiment

Figure 30:
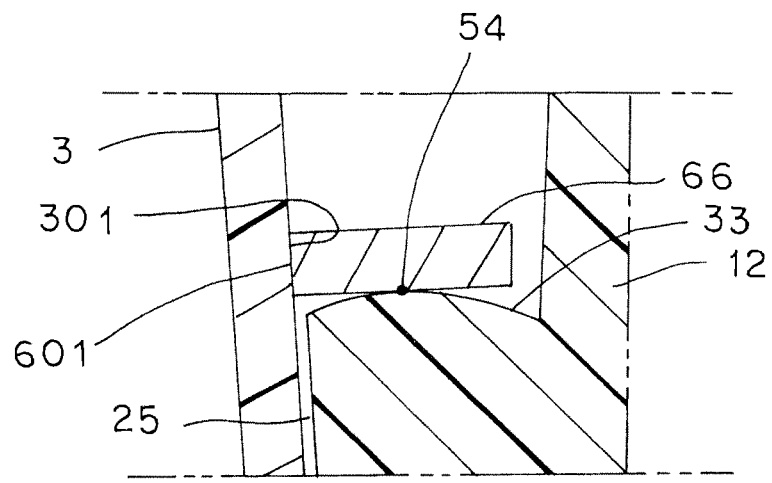
FIG. 30 is a partially enlarged longitudinal cross section (a partially enlarged vertical cross section) of an assembling state of a shaft, a washer, and a mount portion, showing a fifth embodiment of a vehicle outside mirror device according to the present invention.

FIG. 30 shows a fifth embodiment of a vehicle outside mirror device according to the present invention. In the figure, like reference numerals shown in FIG. 1 to FIG. 29 designate like constituent elements.

The vehicle outside mirror device of the first, second, third, and fourth embodiments described previously is the one in which annular line contact portions 50, 51, 52, 53 are provided on an abutment face 35 of washers 6, 60, 61, 62, 63, 64, whereas the vehicle outside mirror device in the fifth embodiment (the door mirror of the fifth embodiment) is the one in which an annular line contact portion 54 is provided on an abutment face 33 of a mount portion 12 at a mirror assembly 4 side.

In other words, in FIG. 30, the sectional shape in a radial direction around a rotational center O-O of a shaft 3 of the mount portion 12 is formed in a shape in which a center part thereof is protruded in an arc shape to the outside relative to each end part on the abutment face 33 of the mount portion 12. The apexes of this arc shape form the annular line contact portion 54.

In FIG. 30, reference numeral 66 designates an ordinary washer, each abutment face of which is formed in the shape of a plane. A linear edge 601 of a rotation stop portion of this washer 66 abuts against an abutment plane 301 of a rotation stop portion of the shaft 3, and the washer 66 is fixed to the shaft 3.

The vehicle outside mirror device in the fifth embodiment (the door mirror of the fifth embodiment) can achieve functions and advantageous effects which are substantially similar to those of the vehicle outside mirror devices of the first, second, third, and fourth embodiments described previously.

As an annular line contact portion provided on the abutment face 33 of the mount portion 12 at the mirror assembly 4 side, in addition to the annular line contact portion 54 described previously, for example, there may be used the one in which: a sectional shape thereof is formed in a shape in which a substantially circular rib is provided at a center part of the abutment face 33 and the apexes of this semicircular rib form an annular line contact portion (not shown); or alternatively, in which a sectional shape thereof is formed in a shape in which a semicircular rib is formed at each end part of the abutment face 33 or the apexes of this semicircular rib forms an annular line contact portion (not shown).

In addition, in the vehicle outside mirror device of the fifth embodiment, there may be used washers 60, 61, 62 in the vehicle outside mirror device of the first embodiment, described previously; there may be used an engagement protrusive portion 603 of a rotation stop portion of a washer 63 and a rim, i.e., an engagingly stop portion 19 of a groove 17 of a rotation stop portion of the shaft 3, in the vehicle outside mirror device shown in FIG. 14 and FIG. 15, described previously; or alternatively, there may be used a number of small engagement protrusive portions (or a number of small engagement recessed portions) 605 of a rotation stop portion of a washer 64 in the vehicle outside mirror device shown in FIG. 16 and FIG. 17 and a number of small engagement recessed portions (or a number of small engagement protrusion portions) 305 of a rotation stop portion of the shaft 3, described previously. Further, a surface-textured surface may be provided on an abutment face of the washer 66.

Sixth Embodiment

Figure 31:
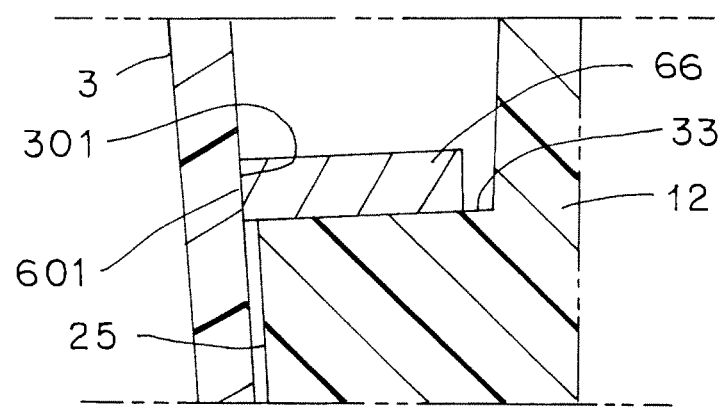
FIG. 31 is a partially enlarged longitudinal cross section of an assembling state of a shaft, a washer, and a mount portion, showing a sixth embodiment of a vehicle outside mirror device according to the present invention.

FIG. 31 shows a sixth embodiment of a vehicle outside mirror device according to the present invention. In the figure, like reference numerals shown in FIG. 1 to FIG. 30 designate like constituent elements.

The vehicle outside mirror device in the sixth embodiment (the door mirror of the sixth embodiment) is the one in which: there is provided an ordinary washer 66, each abutment face of which is formed in the shape of a plane; and the abutment face 33 of the mount portion 12 at the mirror assembly 4 side is formed in the shape of a plane. A linear edge 601 of a rotation stop portion of the washer 66 abuts against an abutment plane 301 of a rotation stop portion of the shaft 3; the washer 66 is fixed to a shaft 3; and an abutment face on a plane of the washer 66 abuts against an abutment face 33 on a plane of a mount portion 12 at a mirror assembly 4 side.

According to the vehicle outside mirror device in the sixth embodiment (the door mirror of the sixth embodiment), the linear edge 601 of the rotation stop portion of the washer 66 abuts against the abutment plane 301 of the rotation stop portion of the shaft 3, so that the washer 66 is mounted on the shaft 3 to disable rotation around a rotational center O-O of the shaft 3. As a result, the vehicle outside mirror device in the sixth embodiment (the door mirror of the sixth embodiment) can reliably prevent generation of abnormal noise even if an annular line contact portion is not provided on at least either of the abutment face 33 of the mount portion 12 at the mirror assembly 4 side and the abutment face of the washer 66, a respective one of which abut against each other.

In the vehicle outside device of the sixth embodiment, there may be used the washers 60, 61, 62 in the vehicle outside mirror device of the first embodiment, described previously; there may be used an engagement protrusive portion 603 of a rotation stop portion of a washer 63 and a rim, i.e., an engagingly stop portion 19 of a rotation stop portion of a shaft 3 in the vehicle outside mirror device shown in FIG. 14 and FIG. 15, described previously; or alternatively, there may be used a number of small engagement protrusive portions (or a number of small engagement recessed portions) 305 of a rotation stop portion of a washer 64 and a number of small engagement recessed portions (or a number of small engagement recessed portions) 605 of a rotation stop portion of the shaft 3 in the vehicle outside mirror device shown in FIG. 16 and FIG. 17, described previously. In addition, there may be used an annular line contact portion 54 which is provided on an abutment face 33 of a mount portion 12 at a mirror assembly 4 side. Further, a surface-textured surface may be provided in an abutment face of a washer 66.

[Description of Example Other than the Embodiments]

Hereinafter, an example other than the first to sixth embodiments described previously will be described. In the first to sixth embodiments, a door mirror 1 which is equipped at a door D of a vehicle will be described. However, in the present invention, there may be another automobile outside mirror device, for example, a fender mirror which is equipped at a vehicle fender or a truck mirror or the like equipped at a pillar or the like. In other words, there may be an automobile outside mirror device comprised of a base which is fixed to a vehicle body and a fixing portion which is provided at a shaft side; and a mirror unit (mirror mounted to be able to tilt relative to the shaft and a tilt portion at a mirror assembly side.

In addition, in the first to sixth embodiments described previously, a mirror housing 7 is an integrally structured element. However, in the present invention, there may be an independent structure in which a mirror housing is comprised of: a main body portion; and a cover adapted to cover the main body portion (a decorative cover, a garnish, shell frame).

Further, in the first to sixth embodiments described previously, positioning means is comprised of: a notch type protrusive portion 22 provided on one face of a mount portion 12; and a notch type recessed portion 16 face which is provided on one face of the shaft holder 14 and with which the protrusive portion engages. However, in the present invention, a notch type recessed portion may be provided on one face of a shaft holder 14 and a notch type protrusive portion may be provided on one face of the mount portion 12.

Furthermore, in the first to sixth embodiments described previously, positioning means is comprised of notch type recessed portion and protrusive portion, i.e., sectional trapezoidal irregularities. However, in the present invention, as a positioning means, there may be the one comprised of a ball and an engagement recessed portion with which that ball engages or the one comprised of semispherical irregularities; further the one comprised of sectional semicircular irregularities; and furthermore, the one comprised of sectional triangular irregularities.

Still furthermore, in the first to sixth embodiments described previously, four engagement claw portions 23 are provided. However, in the present invention, three or five or more engagement claw portions may be provided depending on product specification (such as a scale).

Yet furthermore, in the first to sixth embodiments described previously, a mount portion 12 is comprised of a frame or a bracket independent of a mirror housing 7, and is integrally fixed to the mirror housing 7. However, in the present invention, a mount portion and a mirror housing may be the ones that are integrally structured with each other.

Furthermore, in the first to sixth embodiments described previously, as a mount portion 12, there may be used a single-folded cylindrically shaped mount portion 12 which is formed in a hollow-like sectional recessed shape which is opened at one end (an upper end) thereof and is closed at the other end (a lower end) thereof and in which a through hole 25 is provided at a center of a lower end closed portion. However, in the present invention, there may be used a double mount portion in which a cylindrical portion is integrally provided from a rim of a through hole of the lower end closed portion.

Still furthermore, in the first to sixth embodiments described previously, annular line contact portions 50, 51, 52, 53 are provided on each face 35 of washers 6, 60, 61, 62, 63, 64, 6A, 60A, 61A, 62A (the face abutting against abutment face 33 of mount portion 12 of mirror assembly 4 or abutment face 49 of gear case 37 and a face opposite thereto). However, in the present invention, an annular line contact portion may be provided on one face of a washer (the face abutting against abutment face 33 of mount portion 12 of mirror assembly 4 or abutment face 49 of gear case 37). Moreover, in the present invention, an annular line contact portion is provided on one face of a washer; the other face is maintained to be a plane; and the other face of the washer and an abutment end face of a spring are abutted against each other, thereby increasing a frictional resistance between the other face on a plane of the washer and an abutment end face of the spring; and the washer and the spring are integrated with each other and then no sliding occurs between the other face on the plane of the washer and the abutment end face of the spring, accordingly, whereas sliding can be easily obtained further reliably between an annular line contact portion on one face of the washer and the mirror assembly.

Yet furthermore, in the first to sixth embodiments described previously, annular line contact portions 50, 51, 52, 53 are provided on each face 35 of washers 6, 60, 61, 62, 63, 64, 6A, 60A, 61A, 62A (a face abutting against abutment face 33 of mount portion 12 of mirror assembly 4 or abutment face 49 of gear case 37 and a face opposite thereto), or alternatively, annular line contact portions 54, 55, 56 are provided on the abutment face 33 of the mount portion 12 of the mirror assembly 4 or the abutment face 49 of the gear case 37. However, in the present invention, an annular line contact portion may be provided on one face of a washer (a face abutting against abutment face 33 of mount portion 12 of mirror assembly 4 or abutment face 49 of gear case 37). Moreover, in the present invention, an annular line contact portion may be provided on one face or each face of a washer and an annular line contact portion may be provided on the abutment face 33 of the mount portion 12 of the mirror assembly 4 or the abutment face 49 of the gear case 37. In other words, an annular line contact portion may be provided on at least either one of the abutment faces 33, 49 of the mirror assembly 4 and the abutment face 35 of the washers 6, 61, 62, 63, 64, 6A, 60A, 61A, 62A, a respective one of which abut against each other.

Furthermore, in the first to sixth embodiments described previously, a surface-textured surface is provided on each abutment face 35 including annular line contact portions 50, 51, 52, 53 of washers 6, 60, 61, 62, 63, 64, 6A, 60A, 61A, 62A. However, in the present invention, a surface may not be provided on each abutment face including an annular line contact portion of a washer, or alternatively, among both of the abutment faces of the washer, a surface may be provided on one abutment face on which an annular line contact portion is provided.

Still furthermore, in the first to sixth embodiments described previously, an interposing member is not interposed between a shaft 3 and a shaft holder 14, of a fixing portion, and a mirror assembly 4 and a mount portion 12, of a tilt portion. However, in the present invention, an interposing member (for example, a plate) may be interposed between the shaft 3 and the shaft holder 14, of the fixing portion, and the mirror assembly 4 and the mount portion 12, of the tilt portion, so as to thereby prevent frictional wear between an outer face of a notch type positioning protrusive portion and an inner face of a notch type positioning recessed portion with which the protrusive portion engages.

What is claimed is:

1. A vehicle outside mirror device, enabling a mirror assembly to tilt relative to a vehicle body, said device comprising:
    a base which is fixed to the vehicle body;
    a shaft which is fixed to the base;
    a spring which is disposed in a state in which the spring is compressed at a periphery of the shaft;
    the mirror assembly which has an abutment face and is equipped to be able to tilt relative to the shaft; and
    a washer which has an abutment face and is disposed on the periphery of the shaft and is abutted against the mirror assembly by means of the spring, wherein axially extending apexes form an annular line contact portion, which apexes are provided on at least either one of the abutment face of the mirror assembly and the abutment face of the washer, a respective one of the abutment face of the mirror assembly and the abutment face of the washer abut against an other of the abutment face of the mirror assembly and an abutment face of the washer.

2. The vehicle outside mirror device according to claim 1, wherein
    the annular line contact portion is provided on a face of the washer, which abuts against the mirror assembly of the washer, and a face of the washer opposite to the face abutting against the mirror assembly.

3. The vehicle outside mirror device according to claim 1, wherein
    a surface-textured surface is provided on at least one of the abutment face of the mirror assembly and the abutment face of the washer.

4. The vehicle outside mirror device according to claim 1, wherein:
    a rotation stop portion for stopping the washer from rotating around a rotational center of the shaft, is provided at a respective one of the shaft and the washer; and
    the washer is mounted on the shaft so as to disable rotation around the rotational center of the shaft by means of the rotation stop portion.

* * * * *